(12) United States Patent
Hayashi

(10) Patent No.: US 6,271,934 B1
(45) Date of Patent: Aug. 7, 2001

(54) IMAGE FORMING APPARATUS WHICH CAN CORRECT AN IMAGE SIGNAL CONVERSION TABLE

(75) Inventor: Kohji Hayashi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 08/846,211

(22) Filed: Apr. 28, 1997

(30) Foreign Application Priority Data

Apr. 29, 1996 (JP) .................................................. 8-132700

(51) Int. Cl.[7] .......................... G06K 15/02; H04N 1/40; H04N 1/407; H04N 1/60
(52) U.S. Cl. .......................... 358/1.9; 358/504; 358/521; 358/523; 358/406; 358/455
(58) Field of Search .......................... 358/1.9, 501, 504, 358/518, 519, 520, 523, 401, 406, 521, 300, 455

(56) References Cited

U.S. PATENT DOCUMENTS 4,468,693 * 8/1984 Fujita et al. ........................ 358/523
5,148,289 * 9/1992 Nishiyama et al. ................. 358/521
5,809,366 * 9/1998 Yamakawa et al. ................. 358/519

FOREIGN PATENT DOCUMENTS

| 57-133452 | 8/1982 | (JP) . |
| 61-191168 | 8/1986 | (JP) . |
| 63-303370 | 12/1988 | (JP) . |
| 2-25860 | 1/1990 | (JP) . |
| 2-76760 | 3/1990 | (JP) . |
| 4-77060 | 3/1992 | (JP) . |
| 4-273650 | 9/1992 | (JP) . |
| 5-114962 | 5/1993 | (JP) . |

\* cited by examiner

*Primary Examiner*—Scott Rogers
(74) *Attorney, Agent, or Firm*—Oblon, Spivak, McClelland, Maier & Neustadt, P.C.

(57) ABSTRACT

An image forming apparatus includes an image output unit for forming an image on a recording medium based on output image signals. A storage unit stores target data for reading values obtained by optically reading a gradation pattern, having a plurality of gradation levels, output by the image output unit. A correction unit corrects an image signal conversion table used to convert input image signals into the output image signals to be supplied to the signal output unit, based on reading values obtained by optically reading the gradation pattern output by the image output unit and the target data stored in the storage unit. A changing unit changes the target data.

3 Claims, 27 Drawing Sheets

FIG.33

| | | Bk | Y | M | C | |
|---|---|---|---|---|---|---|
| SP MODE <MENU> | | SCREEN CHANGE | | | CONTENTS | |

[4] SP SPECIFIC Γ-CORRECTION DATA  -PHOTO-   PAGE 3

|  | Bk | Y | M | C |  |
|---|---|---|---|---|---|
| H(LOW DENSITY AREA) | 5 | 5 | 5 | 5 | ⎫ |
| M(MEDIUM DENSITY AREA) | 5 | 5 | 5 | 5 | ⎬ (A) |
| S(HIGH DENSITY AREA) | 5 | 5 | 5 | 5 | |
| ID MAX(WHOLE COEFFICIENT) | 5 | 5 | 5 | 5 | ⎭ |

(B)

PREVIOUS  NEXT

IMAGE FORMING APPARATUS WHICH CAN CORRECT AN IMAGE SIGNAL CONVERSION TABLE

BACKGROUND OF THE INVENTION (1) Field of the Invention

The present invention generally relates to an image forming apparatus, such as a printer and a copy machine, and more particularly to an image forming apparatus in which a gradation pattern having a plurality of gradation levels is output by an image output unit to a recording medium and an image signal conversion table used to convert input image signals into output image signals to be supplied to the image output unit is corrected based on reading data obtained by optically reading the gradation pattern and target data for the reading data.

(2) Description of the Related Art

In a conventional image forming apparatus such as a digital copy machine, an image signal conversion table has been used to change the characteristics of output image data with respect to image data and to emphasize specific density parts of an image. The image signal conversion table is generally provided in an image processing unit of the image forming apparatus. The input image signals input by an image reading unit are converted into the output signals to be supplied to an image output unit (for example, having a laser diode) using an image signal conversion table.

Such an image signal conversion table reflects output characteristics of the image forming apparatus. In a production process of the image forming apparatus, the image signal conversion table is set in the image forming apparatus. However, the output characteristics of the image forming apparatus are changed with time. Thus, after the output characteristics of the image forming apparatus are changed, the input image data cannot be fitly converted into the output image data using the image signal conversion table set in the production process of the image forming apparatus. The quality of an image formed by the image forming apparatus deteriorates.

To prevent the quality of an image from deteriorating caused by changing the output characteristics of the image forming apparatus with time, various measures have been considered. Some of them are as follows.

A first method by which an image forming process (e.g., an electrophotographic image forming process) is controlled to prevent the quality of an image from deteriorating has been proposed. In this method, an image pattern having a plurality of density levels is formed on an image holding body such as a photo sensitive body or a transferring body. The reflection light from the image pattern or transmission light through the image pattern is then detected by an optical sensor. Based on the detecting result, a charging potential, a developing bias and an amount of exposure light are controlled.

A second method by which the image signal conversion table as described above is corrected to prevent the quality of an image from deteriorating has been proposed (Japanese Laid Open Patent Application No.5-114962). In this method, a specific image pattern is formed on a recording sheet. After this, the image on the recording sheet is optically read by an image reading unit. Then, based on information obtained by the image reading unit, the image signal conversion table is corrected.

According to the first method described above, the quality of the image can be automatically controlled without handling of an operator. However, the sensitivity of the optical sensor is generally low for a high density portion in which a large amount of toner is provided. Thus, in only an area other than the high density portions, the quality of the image is effectively corrected. In addition, the deterioration of the quality of an image caused by the deterioration with time of a transferring unit and/or a fixing unit can not be improved.

According to the second method described above, although the recording sheet has to be set in the image reading unit by hand, the quality of all portions of an image can be corrected. In addition, the deterioration of the quality of an image caused by the deterioration with time of the transferring unit and/or the fixing unit can be improved.

The concept in which the quality of an image is corrected by the correction of the image signal conversion table can compare to a feedback control process as shown in FIG. 1. The characteristics of the image forming unit deteriorates with time, so that the output data of the image forming unit differs from target data which has been provided. In this case, as shown in FIG. 29, to decrease the difference between the output data of the image forming unit and the target data, the image signal conversion table is corrected.

However, in the above conventional case where the image signal conversion table is corrected, the target data is fixed. Thus, if the target data is unsuitable, the image signal conversion table can not be suitably corrected. For example, the target data is made based on the characteristics of the image forming apparatus in the production process of the image forming apparatus. The target data is then stored in a storage unit, such as a ROM or a RAM, of the image forming apparatus. The target data should be suitable for every image forming apparatus. However, the characteristics of the image forming apparatus are varied due to the variation of components of the image forming apparatus, so that the fixed target data is unsuitable for some of image forming apparatuses. Thus, in some of the image forming apparatuses, the desired quality of an image is not obtained. In addition, since the target data is decided at the production side of the image forming apparatus, an image formed by using the image signal conversion table which is corrected based on the target data do not always satisfy users of the image forming apparatus.

SUMMARY OF THE INVENTION

Accordingly, a general object of the present invention is to provide a novel and useful image forming apparatus in which the disadvantages of the aforementioned prior art are eliminated.

A specific object of the present invention is to provide an image forming apparatus by which an image having a stable quality can be formed even if characteristics of the image forming apparatus are varied.

Another object of the preset invention is to provide an image forming apparatus by which an image having a quality desired by a user can be formed.

The above objects of the present invention are achieved by an image forming apparatus comprising: image output means for forming an image on a recording medium based on output image signals; storage means for storing target data for reading values obtained by optically reading a gradation pattern, having a plurality of gradation levels, output by the image output means; correction means for correcting an image signal conversion table used to convert input image signals into the output image signals to be supplied to the signal output means, based on reading values obtained by optically read the gradation pattern output by the image output means and the target data stored in the storage means; and changing means for changing the target data.

According to the present invention, the target data can be repeatedly changed and the conversion table can be corrected using the changed target data. Thus, an image having a stable quality can be formed using the conversion table even if characteristics of the image forming apparatus are varied.

The above objects of the present invention are also achieved by an image forming apparatus comprising: image output means for forming an image on a recording medium based on output image signals; storage means for storing target data for reading values obtained by optically reading a gradation pattern, having a plurality of gradation levels, output by the image output means; and correction means for correcting an image signal conversion table used to convert input image signals into the output image signals to be supplied to the signal output means, based on reading values obtained by optically read the gradation pattern output by the image output means and the target data stored in the storage means, wherein the image forming apparatus being coupled to an external unit for processing information, the image forming apparatus receiving from the external unit the target data which should be stored in the storage means.

According to the present invention, the target data used to correct the conversion table is supplied from the external unit. Thus, means for making the target data can be omitted from the image forming apparatus. As a result, the structure of the image forming apparatus can be simplified and the production process of the image forming apparatus can be reduced.

BRIEF DESCRIPTION OF THE DRAWINGS

Other objects, features and advantages of the present invention will be apparent from the following description when read in conjunction with the accompanying drawings, in which:

FIG. 33 is a diagram illustrating an operation panel used as an instruction unit used to change the reference data.

DESCRIPTION OF THE PREFERRED EMBODIMENTS

A description will be given of an embodiment of the present invention. In the embodiment, an electrophotographic copy machine (hereinafter, referred to as a copy machine) will be described as the image forming apparatus.

[Structure and Operation of Copy Machine]

Figure 3:
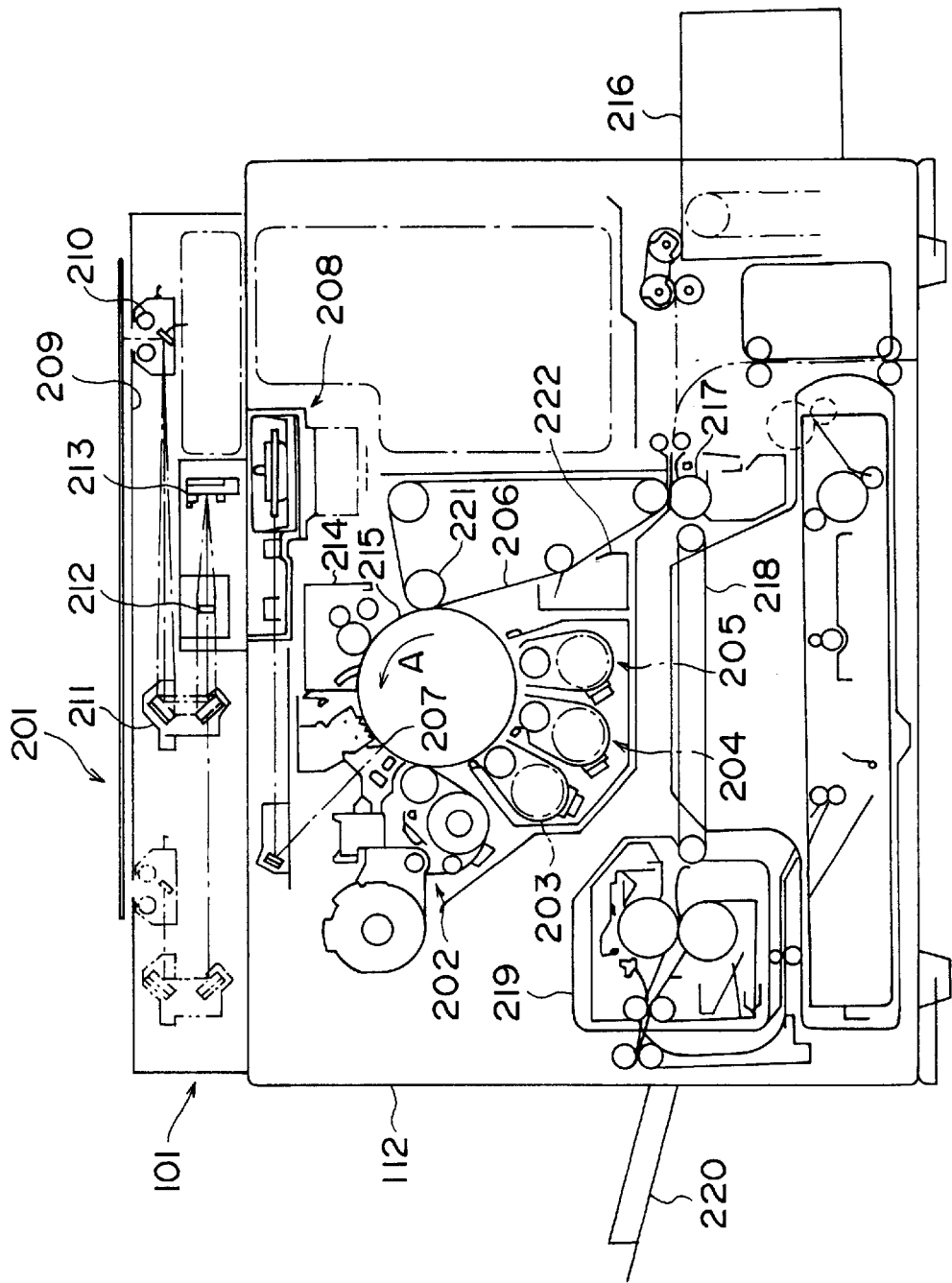
FIG. 3 is a diagram illustrating a structure of a copy machine.

A copy machine 201 is formed as shown in FIG. 3. Referring to FIG. 3, the copy machine 201 has a scanner 101

(an image reading unit) and a printer 112 (an image output unit). The scanner 101 optically reads an original image. The scanner 101 has a contact glass 209 on which an original should be set, an exposure lamp 210, a reflection mirror 211, an image formation lens 212, a CCD image sensor 213 and the like. A halogen lamp is generally used as the exposure lamp 210. The scanner 101 optically reads the original image as follows.

The original set on the contact glass 209 is irradiated by the exposure lamp 210. Reflection light from the original is lead to the image forming lens 212 by the reflection mirror 211. The image forming lens 212 causes the reflection light to form an image on the CCD image sensor 213. The CCD image sensor 213 converts the light of the original image formed thereon into digital electric signals. The CCD image sensor 213 is a full-color image sensor which divides a light signal into, for example, three colors of red (R), green (G) and blue (B) and outputs digital electric signals corresponding to the respective colors. The CCD image sensor 213 has elements arranged in a direction (referred to as a main scanning direction) perpendicular to the drawing of FIG. 3.

The digital electric signals output by the CCD image sensor 213 are supplied to an image process such as a color conversion process, so as to be converted into four color image data items of cyan (C), magenta (M), yellow (Y) and black (k).

In the printer 112 which will be described later, based on the respective color image data items, cyan (C), magenta (M), yellow (Y) and black (K) toner images are separately formed. The toner images are superposed on each other, so that a full-color image is formed.

In the printer 112, a photo sensitive body 215 used as an image holding body is located at the center thereof. The photo sensitive body 215 is an organic photo sensitive (OPC) drum having an outer diameter of about 120 mm. A charging unit 207 used to uniformly charge the photo sensitive body 215, a K-developing unit 202, a C-developing unit 203, an M-developing unit 204, a Y-developing unit 205, an intermediate transferring belt 206 and a cleaning unit are arranged surrounding the photo sensitive body 215.

A laser optical system 208 is located between the scanner 101 and the photo sensitive body 215. The laser optical system 208 outputs a light beam depending on the color image data items. The light beam output by the laser optical system 208 scans the photo sensitive body 215 which has been uniformly charged. The laser optical system 208 has a laser diode which outputs the light beam, a polygonal mirror which deflects the light beam and the like.

The printer 112 forms an image as follows based on, for example, the K-image data (the black color image data).

The light beam, corresponding to the K-image data, output by the laser optical system 208 is projected onto the photo sensitive body 215, so that a latent image is formed on the photo sensitive body 215. The latent image is developed by the K-developing unit 202 so that a K-toner image is formed. The K-toner image is transferred from the photo sensitive body 215 to the intermediate transferring belt 206. Hereinafter, a process for transferring a toner image to the intermediate transferring belt 206 is referred to as a belt transferring process.

The above sequential processes of forming a latent image, developing and of the belt transferring are carried out for the four colors of cyan (C), magenta (M), yellow (Y) and black (K), so that four colored toner images are superposed on the intermediate transferring belt 206. The four colored toner image which are superposed are collectively transferred by a transfer biasing roller 217 to a recording medium, such as a recording sheet, supplied from a sheet supply unit 216.

The recording medium on which the four colored toner images are superposed is fed to a fixing unit 219 by a feed belt 218. The fixing unit 219 heats and presses the superposed four colored toner images on the recording medium so that the four colored toner images are melted and fixed on the recording medium. The recording medium on which the images are completely fixed is ejected to an ejecting tray 220.

Residual toner on the photo sensitive body 215 is collected by the cleaning unit 214 so that the surface of the photo sensitive body 215 is cleaned. After cleaning, the surface of the photo sensitive body 215 is discharged by a discharging unit 221.

After the four colored toner images are transferred from the intermediate transferring belt 206 to the recording medium, residual toner on the intermediate transferring belt 206 is collected by a belt cleaning unit 222 so that the surface of the intermediate transferring belt 206 is cleaned.

[Control System]

Figure 4:
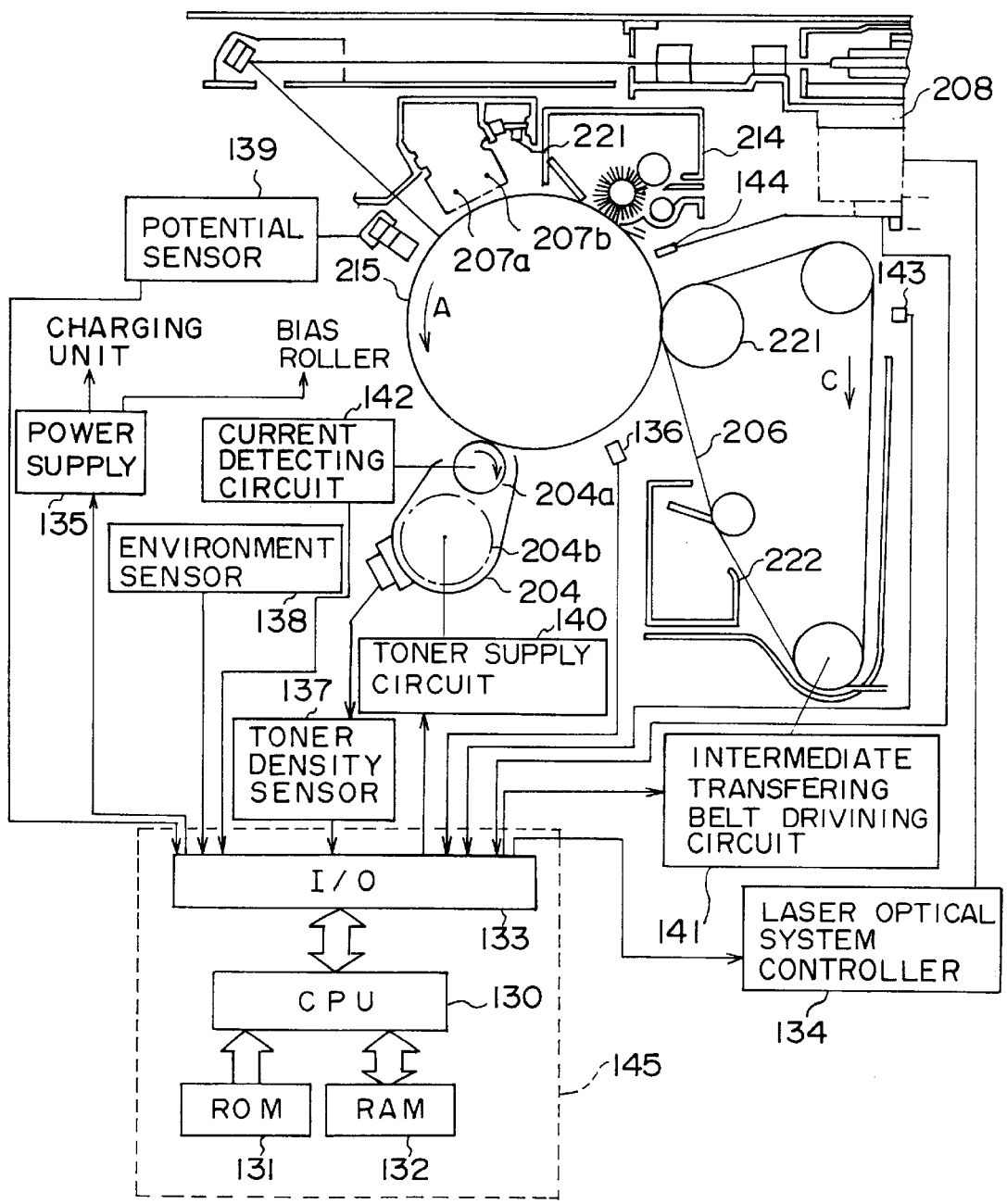
FIG. 4 is a diagram illustrating a control system of the copy machine.

A control system of the copy machine 200 is formed as shown in FIG. 4. Referring to FIG. 4, the copy machine 200 is provided with a main-control unit 145. The main-control unit 145 has a CPU (Central Processing Unit) 130, a ROM (Read Only Memory) 131, a RAM (Random Access Memory) 132 and an input/output interface 133. Control programs executed by the CPU 130 are stored in the ROM 131. Data used by the CPU 130 is stored in the RAM 132. The RAM 132 is also used as a working area for the CPU 130. The input/output interface 132 interfaces between CPU 130 and various types of sensors and units.

A laser optical system controller 134, a power supply circuit 135, a photoelectric sensor 136, a toner density sensor 137, an environment sensor 138, a surface potential sensor 139 for the photo sensitive body 215, a toner supply circuit 140 and an intermediate transferring belt driving circuit 141 are interfaced with the CPU 130 by the input/output interface 132. The laser optical system controller 134 controls of the output of the laser diode of the laser optical system 208 described above. The power supply circuit 135 supplies a charging voltage to the charging unit 207, a developing bias voltages to the respective developing units 202–205 and transferring voltages to the biasing roller 221 and the transfer biasing roller 217.

The photoelectric sensor 136 is formed of a light emission element such as a light emission diode and a light receiving element such as a photo sensor. The photoelectric sensor 136 is located at the lower stream side of the biasing roller 221 in a rotating direction of the photo sensitive body 215. The photoelectric sensor 136 used to detect an amount of adhered toner of a detection pattern formed on the photo sensitive body 215 and an amount of toner adhered to the ground surface of the photo sensitive body 215. The photoelectric sensor 136 is used also to detect residual potential of the surface of the photo sensitive body 215 which has been discharged. Detecting signals output from the photoelectric sensor 4136 are supplied to a photoelectric sensor controller (not shown). The photoelectric sensor controller finds a rate of the amount of adhered toner of the detection pattern to the amount of toner adhered to the ground surface of the photo sensitive body 215. The rate is compared to a reference value. Based on the comparison result, the variation of the density of an image is detected and control signals of the toner density sensor 137 are corrected.

The toner density sensor 137 detects the toner density based on the variation of the permeability of a developer in the respective developing units 202–205. The toner density sensor 137 further compares the detected density of the toner to a reference value. If the detected density of the toner is less than the reference value, that is, in a case where the amount of toner is insufficient in the developing units 202–205, a toner supply signal corresponding to a degree of insufficiency is supplied from the toner density sensor 137 to a toner supply circuit 140.

The potential sensor 139 detects the surface potential of the photo sensitive body 215. The intermediate transferring belt driving unit 141 controls the intermediate transferring belt 206 to be driven.

The M-developing unit 204 shown in FIG. 4 is provided with a developer having the M-toner and carries. The developer in the M-developing unit 204 is agitated by an agitator 204b. A developer limitation member (not shown) is provided near a developing sleeve 204 so that an amount of developer supplied to the developing sleeve 204a is controlled. The developer supplied to the developing sleeve 204a is magnetically maintained on the developing sleeve 204a. The developer on the developing sleeve 204a forms a magnetic brush and is moved in the same direction in which the developing sleeve 204a is rotated.

The K-developing unit 202, the C-developing unit 203 and the Y-developing unit 205 has substantially the same structure as that of the M-developing unit 204 as described above.

[Image Processing Unit]

Figure 1:
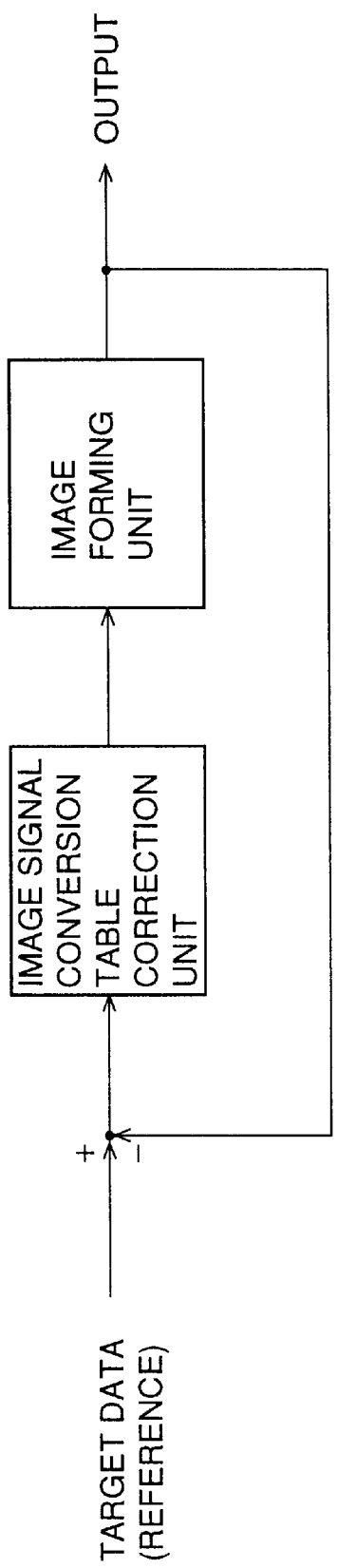
FIG. 1 is a block diagram illustrating a concept in which the quality of an image is corrected by the correction of the image signal conversion table.
Figure 2:
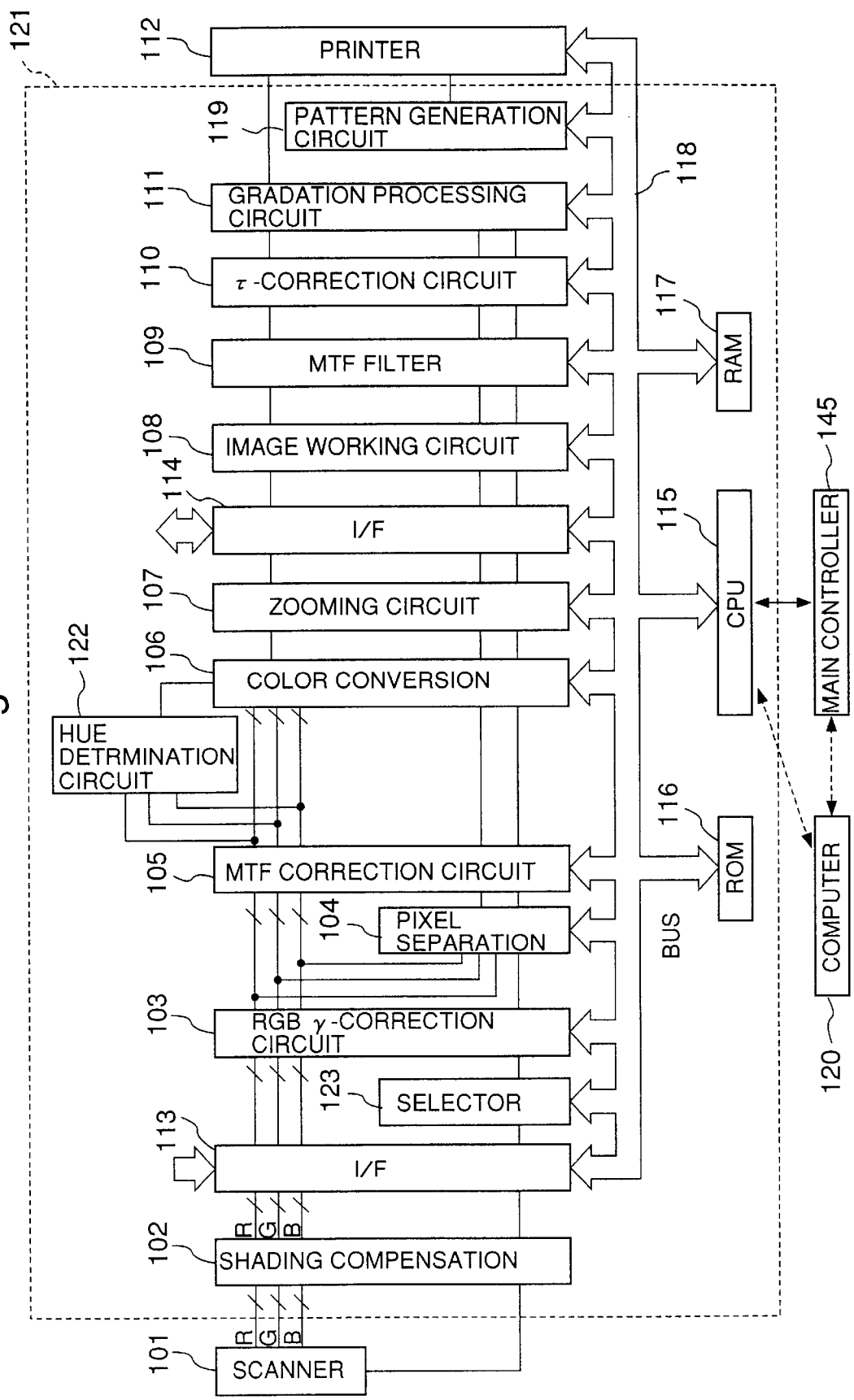
FIG. 2 is a block diagram illustrating a structure of an image processing unit.

An image processing unit of the copy machine 200 is formed as shown in FIG. 2.

Referring to FIG. 2, digital signals obtained by color separation into R (red), G (green) and B (blue) colors are supplied from the scanner 101 to a shading compensation circuit 102. The shading compensation circuit 102 compensates the variation of signals based on the variation of sensitivities of respective elements of the CCD image sensor 213 and the unevenness of the luminance of the exposure lamp 210. The output signals from the shading compensation circuit 102 are supplied to a RGB-τ correction circuit 103. Due to the RGB-τ correction circuit 103, the digital signals from the scanner 101 are changed from information representing reflectivity to information representing lightness.

The output signals of the RGB-τ correction circuit 103 are supplied to a pixel separation circuit 104 and a MTF (Modulation Transfer Function) compensation circuit 105. The pixel separation circuit 104 determines whether each pixel should be in a character portion or a picture portion in an original image. The pixel separation circuit 104 further determines whether each pixel should have a chromatic color or an achromatic color. The pixel separation circuit 104 outputs the determination results for each pixel. The output signals (the determination results) of the pixel separation circuit 104 are supplied to MTF compensation circuit 105, a color conversion-UCR processing circuit 106, a zooming circuit 107, an interface 114, an image working circuit 108, an MTF filter 109, a τ-correction circuit 110 and a gradation processing circuit 111.

The MTF compensation circuit 105 compensates a frequency characteristic of an input system such as the scanner 101, and specifically compensates the frequency characteristic in a high-frequency region. The signals processed by the MTF compensation circuit 105 are supplied to a hue determination circuit 122 and the color conversion-UCR circuit 106. The hue determination circuit 122 determines which hue of R (red), G (green), B (blue), C (cyan), M(magenta) or Y (yellow) the output signal from the MTF compensation circuit 105 corresponds to. The hue determination circuit 122 selects, based on the determination result, a color conversion coefficient used for color conversion in the color conversion-UCR processing circuit 106. The color conversion-UCR processing circuit 106 has a color conversion portion and a UCR (Under Color Removal) processing portion. The color conversion portion compensates the difference between the color separation characteristic of the input system such as the scanner 101 and the spectral characteristic of the colored material (the colored toner) used in the printer, so that the amounts of Y, M and C colored materials necessary for faithful color reproduction are calculated. In the color conversion process, a matrix operation using the following first order masking equation is carried out.

$$\begin{pmatrix} Y \\ M \\ C \end{pmatrix} = \begin{pmatrix} a11 & a12 & a13 \\ a21 & a22 & a23 \\ a31 & a32 & a33 \end{pmatrix} \begin{pmatrix} B' \\ G' \\ M' \end{pmatrix} \quad (1)$$

In the above equation, R', G' and B are respectively complements of R, G and B. Each matrix coefficient aij (i=1–3 and j=1–3) is a color conversion coefficient which depends on the color separation characteristic of the input system and the spectral characteristic of the output system (the printer). In this example, the first order masking equation is used. In addition, the second order terms of B' and G' and higher order terms may be used for further accurate color conversion. The equation may be changed in accordance with hues. In addition, the Neugebauer equation may be also used. In any case, the values of C (cyan), M (magenta) and Y (yellow) can be found from the values of B' (blue), G' (green) and R' (red) (or B, G and R).

The UCR processing portion of the color conversion-UCR processing circuit 106 carries out a UCR process for substituting the K-color (black) for a color of a portion on which the three colors Y, M and C are superposed. Theoretically, the color of a portion on which the three colors Y, M and C are superposed is the K-color (black). However, actually, the portion on which the three colors Y, M and C are superposed is completely black. Thus, the UCR process is carried out to prevent the gray balance in the color reproduction from deteriorating.

The UCR process is carried out by an operation using the following equations.

$$Y'=Y-\alpha \cdot \min(Y, M, C)$$

$$M'=M-\alpha \cdot \min(Y, M, C)$$

$$C'=C-\alpha \cdot \min(Y, M, C)$$

$$K'=\alpha \cdot \min(Y, M, C) \quad (2)$$

In the above equations, $\alpha$ is a coefficient corresponding to the effectiveness of the UCR process. If the coefficient a is equal to "1" ($\alpha$=1), the effectiveness of the UCR process is 100%. The coefficient $\alpha$ may be fixed at a predetermined value. The coefficient $\alpha$ may be changed in accordance with density. For example, the coefficient $\alpha$ for a portion having a high density may be set at a value near "1" and the coefficient $\alpha$ for a highlight portion may be set at a value near "0". In this case, the black reproduction ability in the portion having the high density can be improved, and an image in the highlight portion can be smoothed.

The output signals of the color conversion-UCR processing circuit 106 are supplied to the zooming circuit 107. The zooming circuit 107 processes images to zoom in and out in the lengthwise and widthwise directions. The output signals of the zooming circuit 107 are supplied to the image working circuit 108 through the interface 114. The image working circuit 108 carries out specific processes for an image, such as a repeating process for repeatedly forming the same image on a recording sheet. The output signals of the image working circuit 108 are supplied to the MTF filter 109. The MTF filter 109 carries out a process for changing a frequency characteristic of input signals in accordance with a users preference, such as an edge emphasizing process for improving the resolution of an image and a smoothing process for improving the gradient of an image.

The output signals of the MTF filter 109 are supplied to the τ-correction circuit 110. The τ-correction circuit 110 performs a τ-correction (a τ-conversion) process. The τ-correction circuit 110 converts input image signals into output image signals in accordance with characteristics of the printer 112 using an image signal conversion table. The τ-correction circuit 110 may be additionally perform the so-called background canceling process. The output signals of the τ-correction circuit 110 are supplied to the gradation processing circuit 111. The gradation processing circuit 111 carries out a dither process using a dither matrix so that the gradation of an input image is controlled. For example, when a gradation expression ability of the printer 112 is inferior to that of the scanner 101, a quantizing process is performed using the dither matrix.

As has been described above, the digital signals from the scanner 101 are sequentially processed (from the shading process to the gradation process) so as to be converted into image data to be supplied to the printer 112. The interfaces 113 and 114 shown in FIG. 2 are used to transmit an original image read by the scanner 101 to an external image processing unit and to receive image data from the external image processing unit to supply the image data to the printer 112.

To control the respective circuits in the image processing unit as has described above, a ROM 116, a RAM 117 and a CPU 115 are coupled to the respective circuits by a bus line 118. In addition, the CPU 115 is connected to a system controller 119 by a serial interface. According to this structure, instructions input from an operation unit of the copy machine are received by the system controller 119, and the system controller 119 transmits the received instruction as commands to the CPU 15.

Image data supplied to the printer 112 are input to a laser modulation circuit 400 for controlling emission of the laser diode. The laser modulation circuit 400 is formed as shown in FIG. 5.

Figure 5:
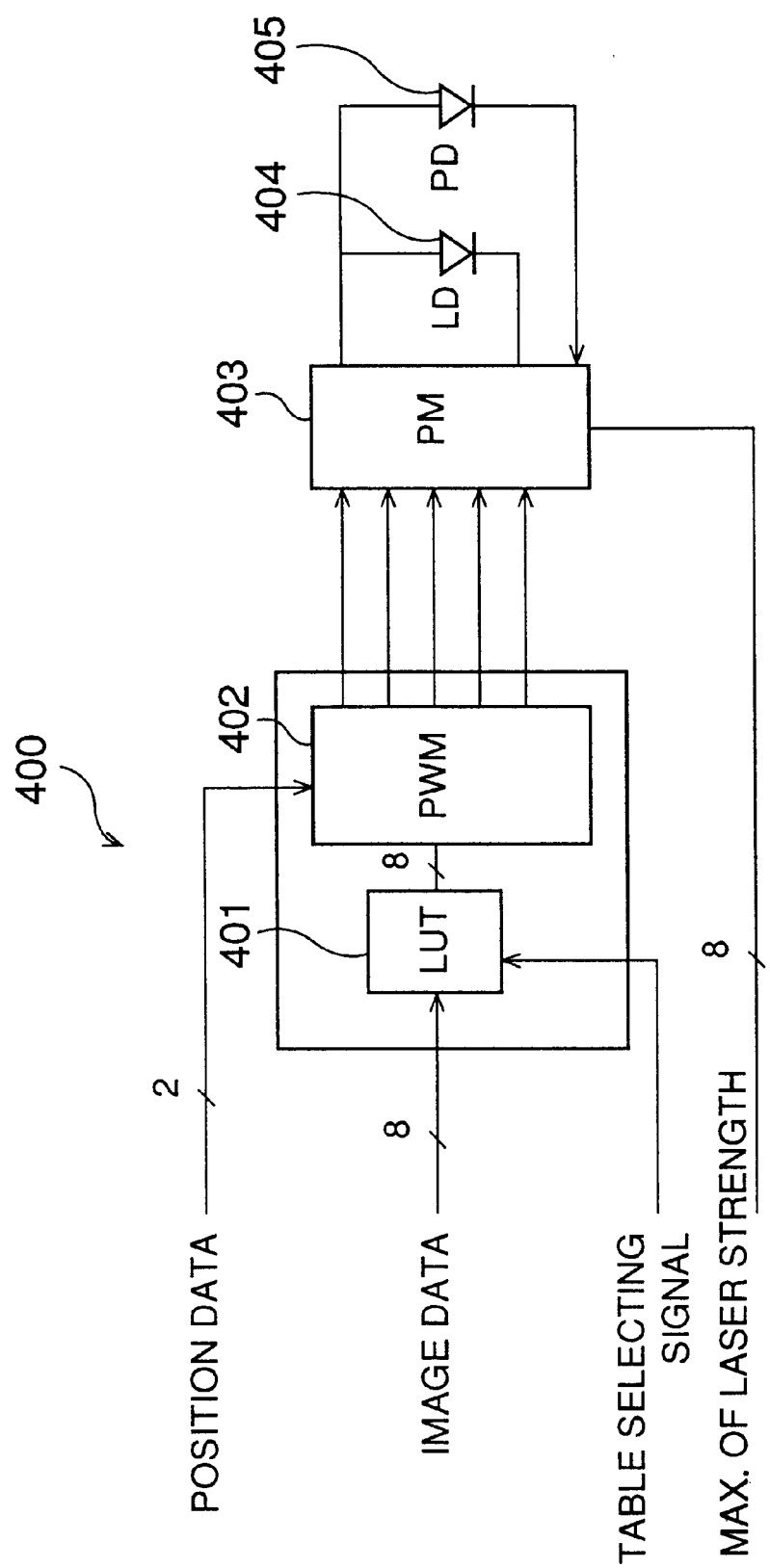
FIG. 5 is a circuit block diagram illustrating a laser modulating circuit.

Referring to FIG. 5, input image data is formed of 8 bits for each pixel. The image data is τ-converted using a look-up-table 401, and is then supplied to a pulse width modulation circuit 402. The pulse width modulation circuit 402 decides a pulse width based on a signal formed of upper three bits of the image data formed of 8 bits. The pulse width is a selected one from among eight states (values) which are expressed using 3 bits. After the pulse width is decided, a power modulation circuit 403 provided at the next stage of the pulse width modulation circuit 402 modulates the power of the laser diode. That is, the strength of the emission of the laser diode is modulated. The power modulation circuit 403 modulates the power based on a signal formed of lower five bits of the image signal. The power level is selected from among thirty-two states (values) which can be expressed using five bits.

Based on the image data which has been modulated in accordance with the pulse width modulation and the power modulation manners, the laser diode 404 irradiates. The strength of the irradiation of the laser diode 404 is monitored by a photo-detector 405. The output signals of the photo-detector is fed back to the power modulation circuit 403 so that the strength of irradiation is corrected for each pixel.

In this embodiment, a writing frequency of the printer 112 is 18.6 MHz and a scanning time for each pixel is 53.8 nsec.

In addition, the size of the beam spot in the main scanning direction is not greater than 90% of the size of a single pixel, preferably equal to 80% of the size of a single pixel. The size of the beam spot in the main scanning direction is defined as the width of the beam spot at a position at which the strength of the beam is one $e^2$-th of the peak level of the beam. For example, in a printer printing an image formed of pixels at the resolution of 400 DPI (dot/inch), each pixel having the size (the diameter) of 63.5 microns ($\mu$m), it is preferable that the size of the beam spot is not greater than 50 micron ($\mu$m).

[Procedure for Making Conversion Table]

A description will now be given of a general method for making the image signal conversion table (hereinafter, referral to as a conversion table) used in the τ-correction circuit 110. In the following description, a "gradation conversion curve" is defined as a curve connecting values in the conversion table.

Figure 6:
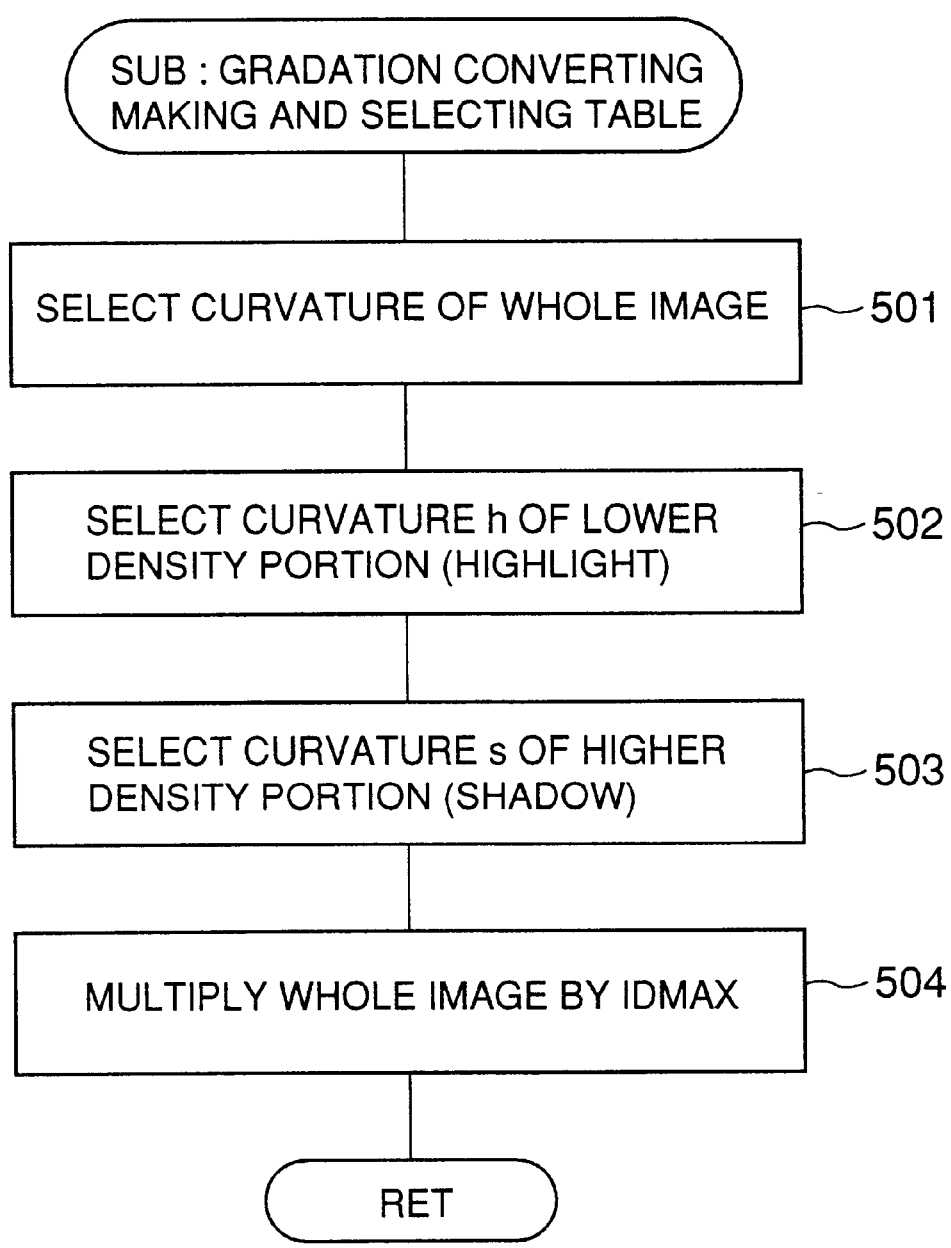
FIG. 6 is a flowchart illustrating a procedure for making a conversion table.

The conversion table is made in accordance with a procedure shown in FIG. 6.

The procedure has the steps of:

1) selecting a curvature for the whole image (501);

2) selecting a curvature for a low density portion (a highlight portion) (502);

3) selecting a curvature for a high density portion (a shadow portion)(503); and 4) the whole image is multiplied by a coefficient to make the image density be a desired value (504).

A description will now be given, with reference to FIG. 7, of the step 501.

The gradation conversion for changing the curvature of the whole image with respect a reference gradation conversion curve A is defined as B. In addition, the gradation conversion for changing the curvature of the low density portion (the highlight portion) is defined as CH, and the gradation conversion for changing the curvature of the high density portion (the shadow portion) is defined as CS.

Under the above definitions, for example, a case where the gradation conversion curve A is converted into a gradation conversion curve E by the gradation conversion B is expressed by E=B(A).

A process in the step 501 can be described using the C programming language as indicated in the following list 1.

<LIST 1>

```
typedef int Table[256];
Table A,E;
int B(int A, int curvature)
{
   int value;
   /* operation for changing curvature in accordance with a
      value of curvature */
   . . .
   return value;
{
/* full ( ): a process for changing the curvature of the whole
   image, */
Table full (int curvature)
{
   /*curvature is a degree of curve *1
   int i;
   for (i=0; i=255; i++)
```

```
    E[i]=B[A[i],curvature);
    return E;
}
```

In the above, B is a function for changing the curvature of A as has described above. In a case where image data is formed of 8 bits, a second order Bèzier function is used as the function B, the Bèzier function satisfying conditions of:

$$0=B(0,n); \text{ and}$$

$$255=B(255,n)$$

where n is an integer.

The Bèzier function satisfying the above conditions is expressed, as a second order Bèzier curve, using a line P0P1 connecting a start point P0(0,0) and a terminating point P1(255,255), a line L crossing the line P0P1 and a control point P2. The control point P2 is on the line L and expressed using, as a parameter, a distance d from an intersecting point of lines P0P1 and L.

In the above function, the distance d is caused to be in proportion to the integer (curvature) which is an argument of the function B, so that the curvature can be changed.

Figure 8:
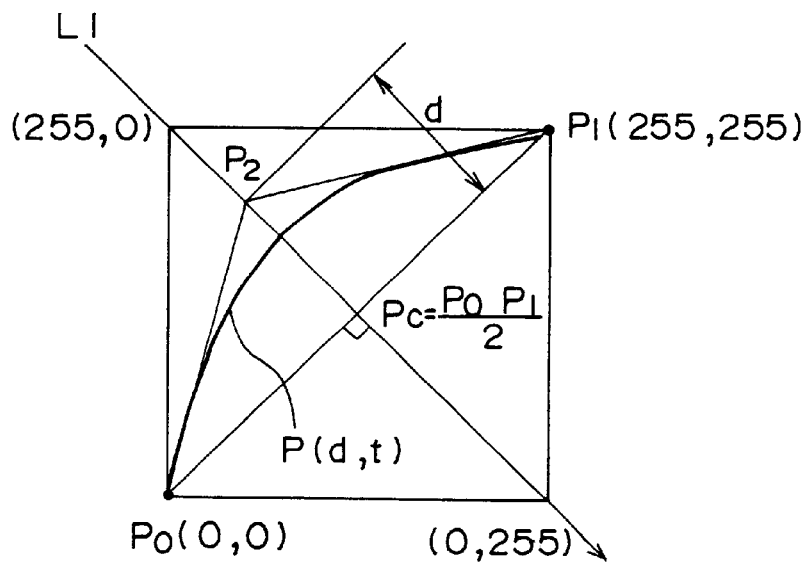
FIG. 8 is a diagram illustrating how to find a gradation conversion curve of the whole image.

For example, a case where the lines P0P1 and L1 are perpendicularly crossed is shown in FIG. 8.

When the distance d between the control point P2 and a center point Pc=(P0+P1)/2=(127.5,127.5), a point (127,127) or a point (128,128) is the parameter, the control point P21 can be expressed as follows.

$$P2(d)=Pc+(-d/\sqrt{2}, d/\sqrt{2})=(127.5-d/\sqrt{2}, 127.5+d/\sqrt{2}) \quad (3)$$

Thus, the gradation conversion curve P(d,t) can be expressed by the following equation;

$$P(d,t)=P0\cdot t^2+P2(d)\cdot t\cdot(1-t)+P1(1-t)^2 \quad (4)$$

where t is a parameter ($0 \leq t \leq 1$).

Figure 7:
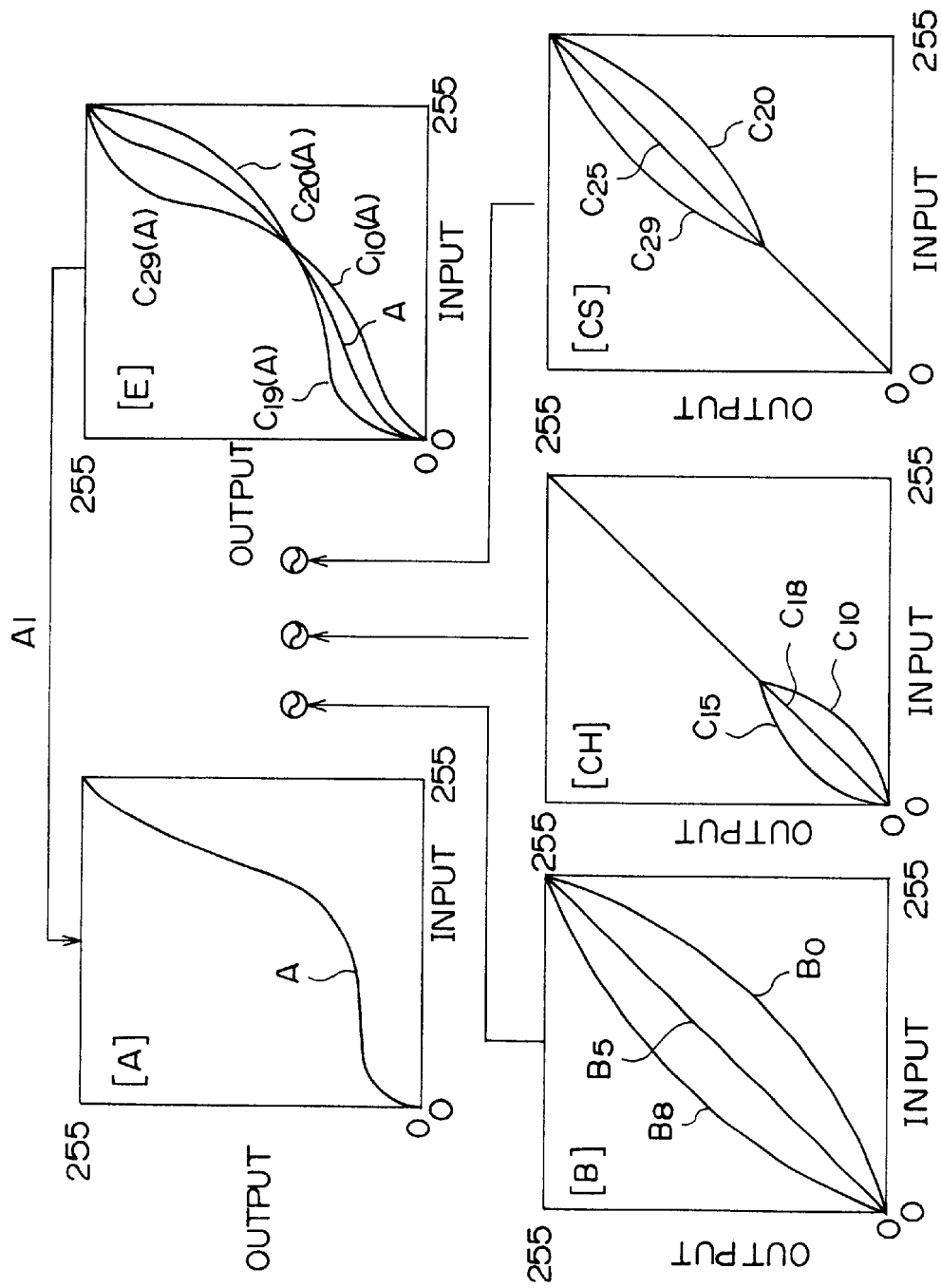
FIG. 7 is a diagram illustrating the first step of the procedure shown in FIG. 6.

The above P(d,t) is given as a set (x,y) of an input x and an output y of the gradation conversion curve as shown in FIG. 7. Thus, the operation x=A is performed using the integer A which is given as an argument for the function B, and t is found from the equation (4) and the result is substituted for t of the equation (4) so that the output y is found.

According to the above operations, the input x is τ-corrected so that y is output.

Relationships between x ($0 \geq x \geq 255$) and y which are obtained by the τ-correction of x may have been previously calculated and stored as a table (a conversion table) in the ROM 116 in place of the above operations for the τ-correction performed every time the image data (x) is input. In this case, the operation time needed to obtain the output y corresponding to the input x can be reduced.

A few or a few tens of sets of conversion tables for different curvatures may be stored in the ROM 116. Each of the curvatures is given as the argument (curvature) for the function B indicated in the above LIST 1. Thus, in due consideration of a case where a plurality of conversion tables for different curvatures are obtained, the LIST 1 is changed to the following LIST 2.

<LIST 2>
```
const table_max=9;
typedef int Table[256];
Table A, E, B[table_max];
/*process for changing curvature of the whole image */
Table full(int curvature)
{
    /* curvature identifies the curvature */
    int i;
    for(i=0; i<256; i++)
        E[i]=B[curvature][A[i]];
    return E;
}
main( )
{
    /*curvature is the curvature (a degree of curve) */
    int curvature=1;
    E=full(curvature);
}
```

In the above LIST 2, since "Table_max=9" is described, the number of tables for different curvatures is set at nine.

In the above example, the gradation conversion curve is obtained using the Bèzier function. Further, the gradation conversion curve can be obtained using a higher order function, an exponential function or a logarithm function.

A description will now be given of the steps 502 and 503 shown in FIG. 6.

Processes for changing the curvatures of the gradation conversion curves for the low density portion (the highlight portion) and the high density portion (the shadow portion) can be carried out in substantially the same procedure as the process of the step 501 as described above.

The above LIST 2 can be changed to the following LIST 3 having a general form which can be applied to the change of the curvature for the low density portion (the highlight portion) and the high density portion (the shadow portion).

<LIST 3>
```
const table_max=9
typedef int Table[256];
Table A, E, B[table_max];
/* Transform( ):a process for changing curvature */
Table Transform(Table Transformer, Table original)
/* this function carries out a process for converting the
    gradation conversion curve (original) using the gradation
    conversion curve (Transformer) so that the curvature is
    changed. */
    int i;
    for(i=0; i<=255; i++)
        E[i]=Transformer[original]
    return E;
}
main( )
{
    /*cuxvature is the curvature (a degree of curve) */
    int curvature=1;
    E=Transform(B[curvature],A);
/* The gradation conversion curve A is converted using the
    gradation conversion curve B[curvature] so that the cur-
    vature is changed. */
}
```

When a highlight conversion curve CH[h] and a shadow conversion curve CS[s] are introduced to the above LIST 3, the LIST 3 is changed as follows.

<LIST 4>
```
const table_max=9;
typedef int Table[256];
Table A, B[table_max], E
CH[table_max], CS[table_max];
/* Transformo: a process for changing the curvature, */
```

Table Transform(Table Transformer, Table Original)
{
main( )
{
  int curvature, h, s;
/* values of curvature, h and s are changed so that the curvature of a curve is changed */
  /* the curvature for the whole image is changed */
  E=Transform(B[curvature],A);
  /* the curvature for the low density portion (the highlight portion) is changed */
  E=Transform(CH[h],E);
  /* the curvature for the high density portion (the shadow portion) is changed */
  E=Transform(CS[s],E);
}

In the above LIST 4, curvature, h and S are respectively values used to determine the curvatures for the whole image, the highlight portion and the shadow portion. The curvature for the low density portion is independent of the curvature for the shadow portion.

A description will now be given, with reference to FIG. 9, of how to make the gradation conversion curve in which the curvature is partially changed, for example, the curvature for the highlight portion is changed.

Figure 9:
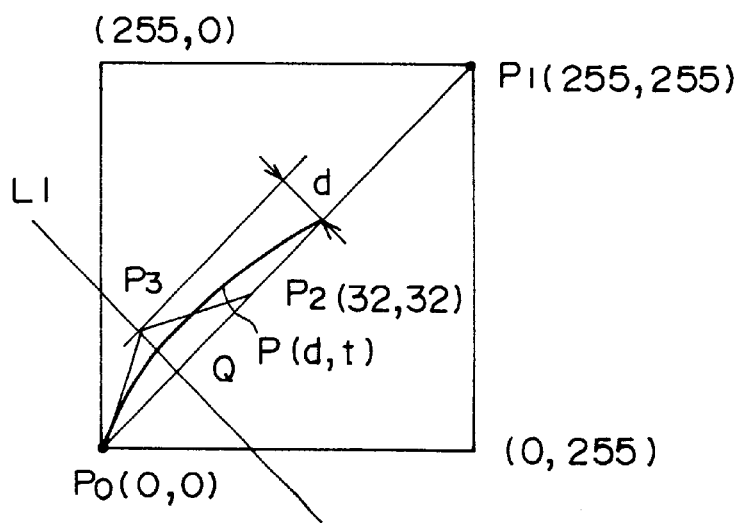
FIG. 9 is a diagram illustrating how to find a gradation conversion curve of a highlight portion.

As shown in FIG. 9, the gradation conversion curve for the highlight portion can be found, as a third order Bèzier curve, using the line POP1, the line L1, the first control point P2 and the second control point P3. The line POP1 extends from the starting point P0 to the terminating point P1. The line POP1 and the line L1 are perpendicularly crossed to each other. The first control point P2 is on the line POP1. The second control point P3 is on the line L1 and expressed using, as a parameter, a distance from an intersecting point of the line POP1 and the line L1.

For example, the starting point P0 is defined as P0=(0,0), and the terminating point P1 is defined as P1=(255,255). The first control point P2 is defined as P2=(32,32).

Under the above conditions, the second control point P3 can be expressed as follows.

$$P3(d)=(16,16)+(-d/\sqrt{2},d\sqrt{2}) \quad (5)$$

Using the points P0, P1, P2 and P3, the gradation conversion curve P(d,t) is calculated as follows.

$$P(d,t)=P0 \cdot t^3+3 \cdot P2 \cdot t^2 \cdot (1-t)+3 \cdot P3(d) \cdot t \cdot (1-t)^2+P1 \cdot (1-t)^3 \quad (6)$$

A point on a line L2 parallel to the vertical axis shown in FIG. 9 may be defined as the second control point P3. In this case, the second control point P3 is expressed using, as a parameter, a distance d from an intersecting point of the line POP1 and the line L2 as follows.

$$P3(d)=(16,16)+(0,d) \quad (7)$$

A case of how to make the gradation conversion curve for the highlight portion was described above. The gradation conversion curve for the shadow portion may be made in the same manner as in the above case by suitably selecting the points P0 and P1.

The terminating point P1 may be defined as P1=(64,64) in place of P1=(255,255). That is, the terminating point P1 can be set at a point on a line m extending from a point (0,0) to a point (255,255). A part of the line m which is not included in the line POP1 functions as an identity conversion in the gradation conversion, and other parts function as the gradation conversion curve used to change the curvature for specific density portions such as the highlight portion and the shadow portion.

[Auto Color Calibration]

A description will now be given, with reference to FIG. 10, of an auto color calibration (ACC). In the auto color calibration, the conversion table is calibrated so that the gradation of an image output from the printer is controlled.

Figure 10:
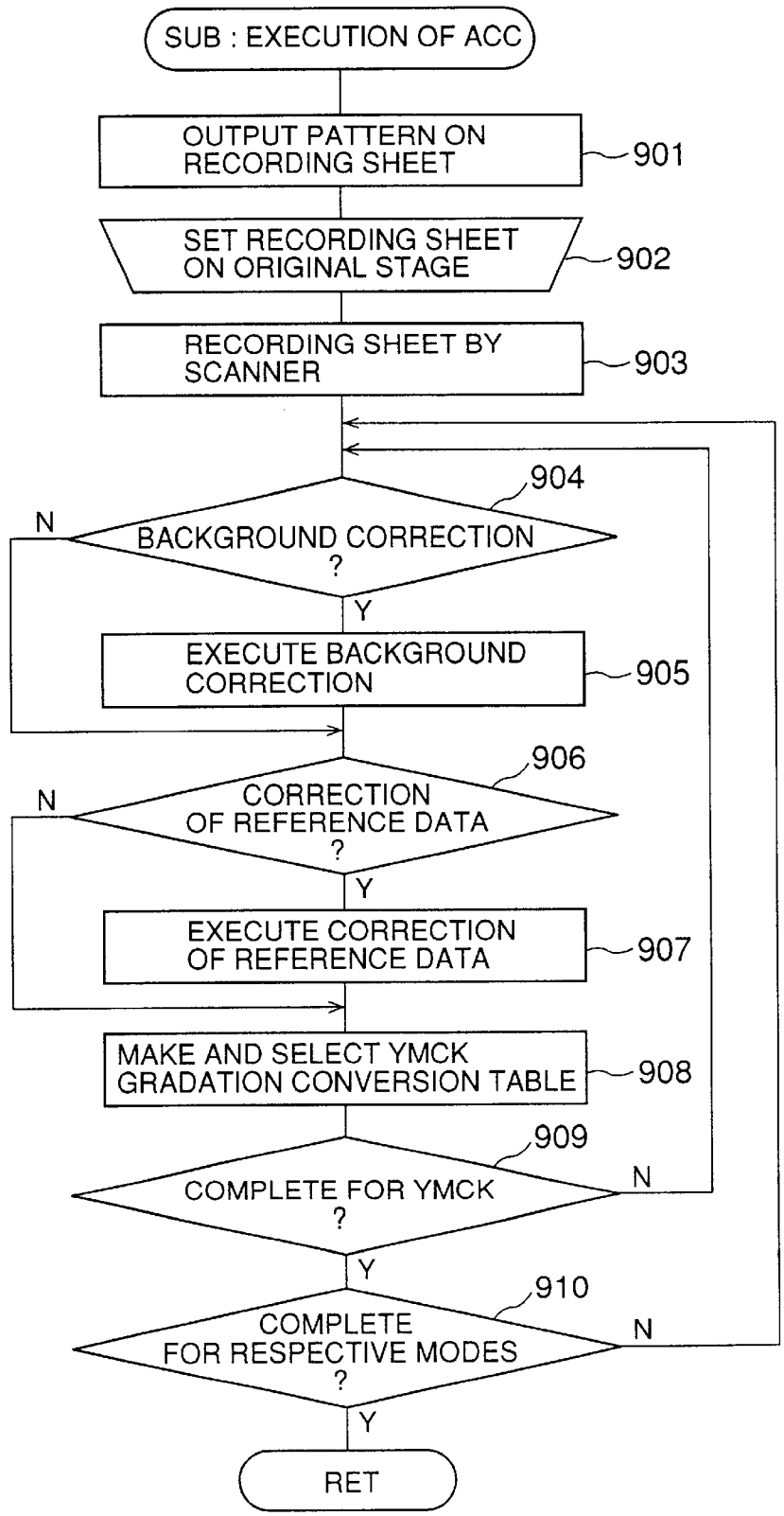
FIG. 10 is a flowchart illustrating an operation for an automatic gradation correction.

FIG. 10 is a flowchart illustrating an operation of the ACC.

Figure 11:
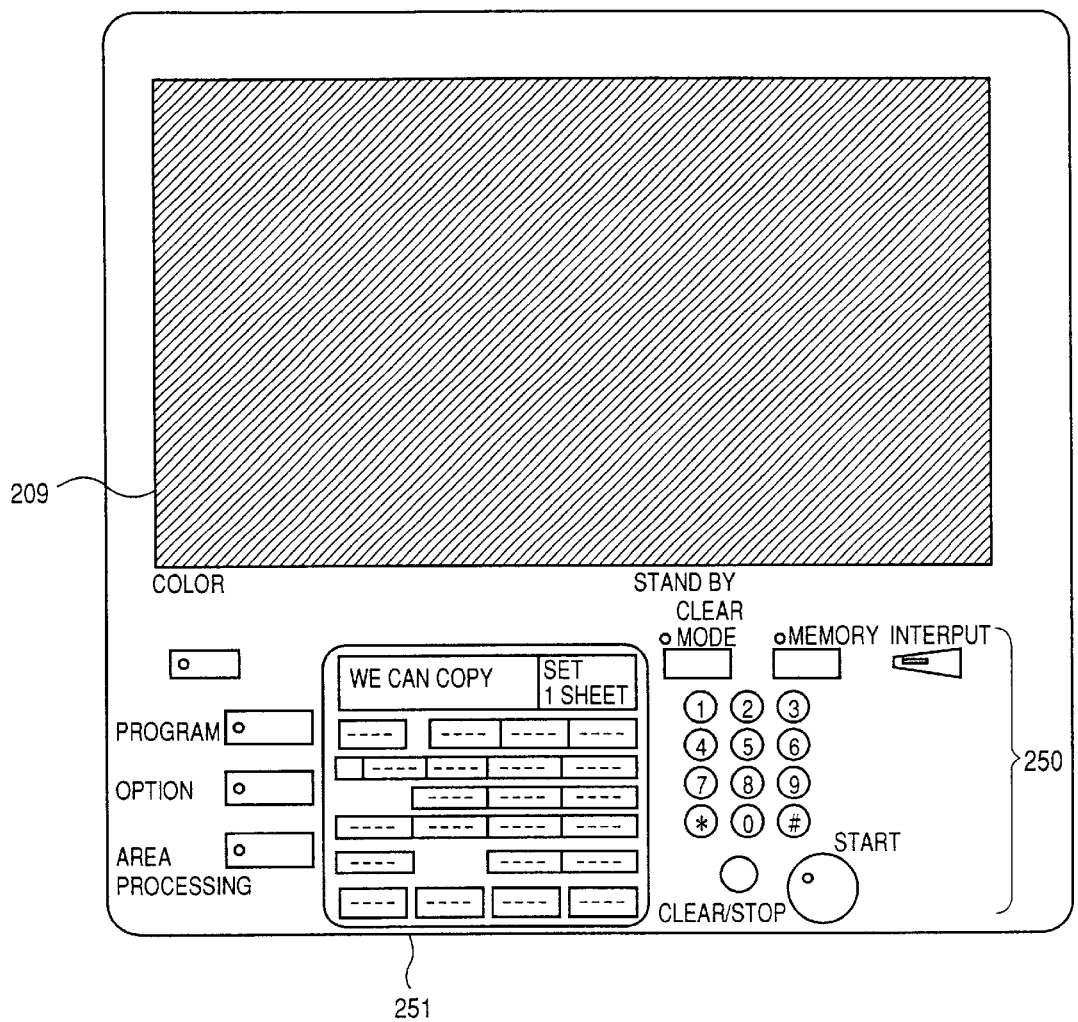
FIG. 11 is a diagram illustrating an operation panel of the copy machine.

The copy machine according to the embodiment of the present invention has an operation portion 250 as shown in FIG. 11. A user can select various functions which should be executed by the copy machine, using the operation portion 250. The operation portion 250 has a liquid crystal screen 251 formed as a touch panel so that the operation portion 250 functions not only as a display unit but also as an input unit.

Figure 12:
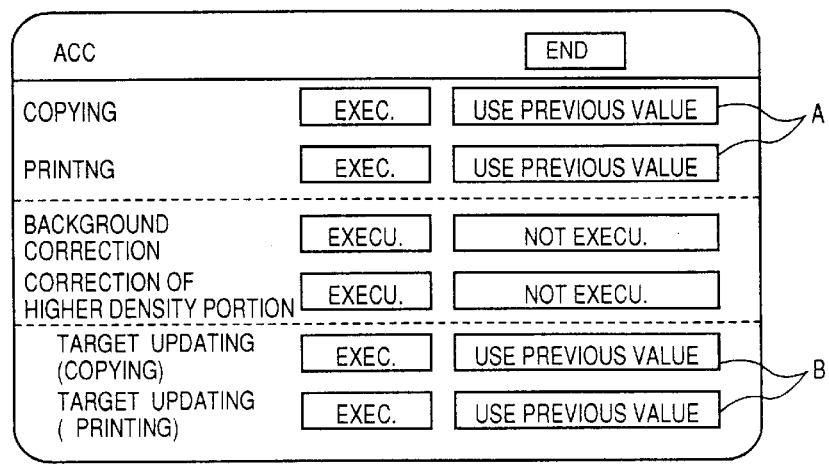
FIG. 12 is a diagram illustrating an example of a screen of a liquid crystal display panel in a case where the automatic gradation correction is carried out.

The liquid crystal screen 251 (the touch panel) is operated so that an ACC menu is read out. As a result, a screen as shown in FIG. 12 is displayed. In this screen, when an "EXECUTION" for a copying operation is specified, the auto color calibration for the copying operation is carried out. In addition, when the "EXECUTION" for a printing operation is specified, the auto color calibration for the printing operation is carried out. In the "copying operation", an original image is read by the scanner 101 and the read image is formed on a recording medium. In the "printing operation", an image is formed on a recording medium based on image data supplied from a computer.

A case where the copy operation is specified will be described below.

Figure 13:
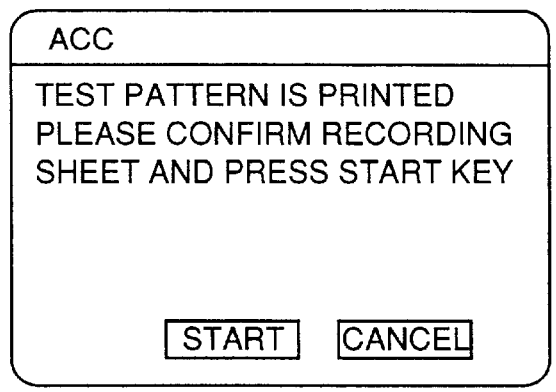
FIG. 13 is a diagram illustrating an example of a screen of the liquid crystal display panel in a case where an instruction for executing the automatic gradation correction is issued.

In the liquid crystal screen 251 shown in FIG. 12, the "EXECUTION" for the printing operation is specified, so that the display on the liquid crystal screen 251 is changed as shown in FIG. 13. In this screen, when a print-start key is operated, the copy machine 209 performs a process in step 901 shown in FIG. 10. That is, a plurality of density gradation patterns, as shown in FIG. 14, corresponding to respective colors Y, M, C, K, and character and photographic modes are formed on a transfer body.

The gradation patterns have been previously stored in the ROM 115 of the image processing unit.

There are sixteen types of gradation patterns identified by hexadecimal digits 00h, 11h, 22h, . . . , EEh, FFh.

Figure 14:
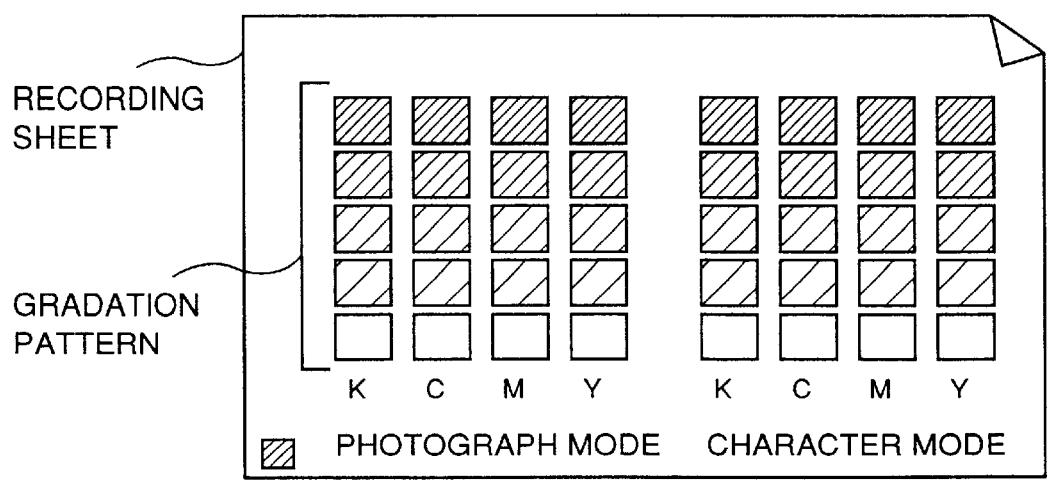
FIG. 14 is a diagram illustrating an example of a gradation pattern formed on a recording sheet.

In the example shown in FIG. 14, five gradation patterns are selected from among the sixteen types of gradation patterns and formed on a recording sheet (the transfer body). The five gradation patterns of each of four colors Y, M, C, K are formed in two modes, the character mode and the photographic mode, so that forty gradation patterns are formed on the recording sheet.

In this embodiment, processes for deciding laser writing values for each pixel of a pattern in the character mode and the photographic mode differ from each other. For each pixel of the pattern in the character mode, the dither process is not used and a value is selected from among 256 gradation values.

On the other hand, in the photographic mode, the sum of writing values for two pixels adjacent to each other in the main scanning direction is distributed to the two adjacent pixels so that new writing values for the two pixels are decided.

For example, in a case where writing values n1 and n2 are respectively given for the first pixel and the second pixel adjacent to each other, new writing values n1' and n2' for the first and second pixels are decided as follows.

In a case of (n1+n1≦255), n1' and n2' are decided in accordance with the following calculation:

$$n1'=n1+n2; \text{ and}$$

$$n2'=0.$$

In a case of (n1+n2>255), n1' and n2' are decided in accordance with the following calculation:

$$n1'=255; \text{ and}$$

$$n2'=n1+n2-255.$$

In addition, n1' and n2' may be also decided as follows. n1' and n2' are decided,
in a case of (n1+n2≦128), in accordance with the following calculation:

$$n1'=n1+n2; \text{ and}$$

$$n2'=0,$$

in a case of (128<n1+n2≦256), in accordance with the following calculation:

$$n1'=128; \text{ and}$$

$$n2'=n1+n2-128,$$

in a case of (256<n1+n2≦383), in accordance with the following calculation:

$$n1=n1+n2-128; \text{ and}$$

$$n2'=128, \text{ and}$$

in a case of (383<n1+n2), in accordance with the following calculation:

$$n1'=255; \text{ and}$$

$$n2'=n1+n2-255.$$

Figure 15:
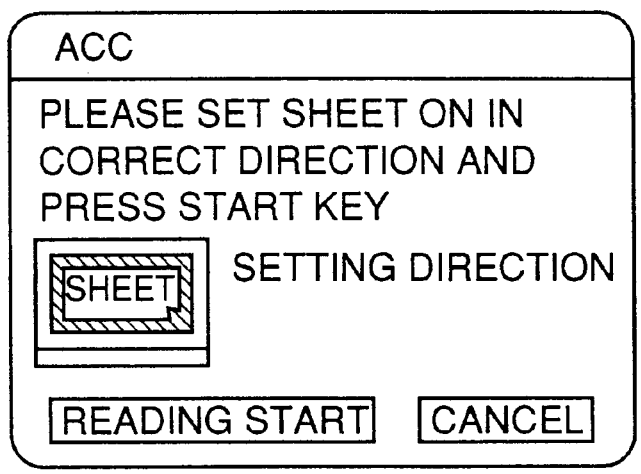
FIG. 15 is a diagram illustrating an example of a screen of the liquid crystal display panel in a case where the recording sheet provided with the gradation pattern is output by the copy machine.

After the gradation patterns are formed on the recording sheet and the recording sheet is ejected from the copy machine, the display on the liquid crystal screen 251 is changed as shown in FIG. 15. That is, a message requiring the user to set the recording sheet (a test pattern sheet), having the gradation patterns, on the contact glass 209 of the scanner 101 is displayed on the liquid crystal screen 251. In accordance with the message, the user sets the test pattern on the contact glass 209 and carries out a start operation (902). At this time, the scanner 101 starts a reading operation, the scanner 101 reads the four colored (Y, M, C and K) gradation patterns and the background of the test pattern sheet and outputs RGB digital signals (903).

It is then determined whether a background correction has been instructed on the liquid crystal screen 251 shown in FIG. 12 (904). If the background correction has been instructed, the background correction which will be described later is performed (905).

After this, it is determined whether instructions to correct target data for the conversion table have been received, that is, whether "target updating" has been instructed on the liquid crystal screen 251 shown in FIG. 12 (906). If the instructions have been received, a process for updating target data is performed (907).

The target data is used to correct the conversion table in the ACC process. Hereinafter, the target data is referred to as reference data.

Based on the reference data updated in step 907, the conversion table to be used in the τ-correcition circuit 110 is corrected (908). The processes from step 904 to step 908 are performed for the respective colors (Y, M, C and K) (909) and for the character mode and the photographic mode (910).

Figure 16:
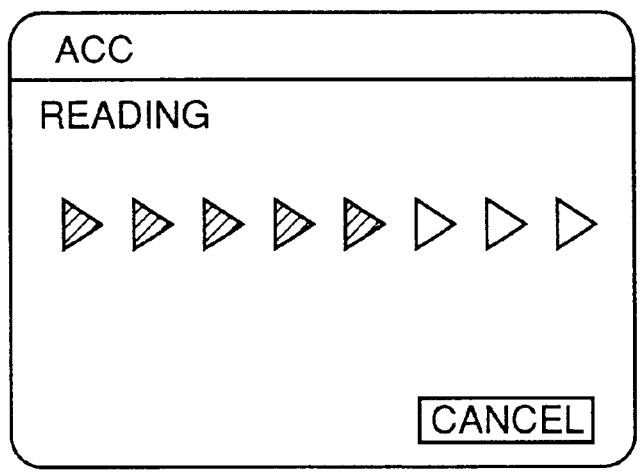
FIG. 16 is a diagram illustrating an example of a screen formed on the liquid crystal display panel while a process corresponding to steps 904 to 910 shown in FIG. 10 is being carried out.

While the processes from step 904 to step 910 is being performed, a picture as shown in FIG. 16 is shown on the liquid crystal screen 251.

Keys for (TARGET UPDATING (IN COPYING OPERATION)] shown in FIG. 12 are operated to update the reference data used to correct the conversion table in the copying operation. Keys for [TARGET UPDATING (IN PRINTING OPERATION)] shown in FIG. 12 are operated to update the reference data used to correct the conversion table in the printing operation.

In this embodiment, the "target updating" is performed in the copying operation and in the printing operation separately. However, the reference data (the target data) used to correct the conversion tables in the copying operation and the printing operation may be updated simultaneously.

After the conversion table is corrected, the former conversion table which is not corrected is memorized. As a result, if the user is not pleased with the quality of an image formed using the conversion table which is corrected, the conversion table which is corrected can be changed to the former conversion table which is not corrected. In this case, a portion A shown in FIG. 12 is operated. The reference data can be changed, in the same manner as the conversion table, to the former reference data which is not updated. In this case, a portion B shown in FIG. 12 is operated.

In this embodiment, the user can select, in the ACC process, whether or not the background correction should be performed. A description will now be given of meanings of the background correction.

The background correction has two meanings. First, due to the background correction, the conversion table can be accurately corrected regardless of the whiteness of the recording sheet on which the gradation patterns are formed.

Even if the gradation patterns are formed on the recording sheet based on the same image data, RGB digital signals obtained by reading the gradation patterns are varied in accordance with the whiteness of the recording sheet on which the gradation patterns are formed. Thus, to prevent this, the background correction is performed.

The gradation patterns are formed on a regenerated paper and the gradation patterns on the regenerated paper are read by the scanner 101. The regenerated paper generally has a low whiteness and includes a high yellow color component. In this case, if the background correction is not performed, the conversion table for yellow is corrected using the gradation patterns formed on the regenerated paper so that an amount of yellow component included in the output signal with respect to the input signal of the conversion table is reduced. In a case where an image is formed on a paper having a high whiteness, such as an art paper, using the above corrected conversion table, the image formed on the paper includes a small amount of yellow component, so that the color reproduction ability of the image formed on the paper deteriorates.

The second meaning of the background correction is that the conversion table can be accurately corrected regardless of the thickness of a recording sheet on which the gradation patterns are formed.

In a case where the gradation pattern is formed on a thin recording paper, a color of a pressure plate pressing the recording paper on the contact glass 209 is seen through the recording paper. As a result, the scanner 101 reads a color into which the color of the recording paper and the color of the pressure plate are mixed.

For example, in a case where the pressure plate is gray, an image signal output from the scanner 101 corresponds to a density higher than an intrinsic density of the recording paper. Thus, the conversion table is corrected so that the output signal having a lower density is obtained when the input signal is supplied to the conversion table. In a case where an image is formed on a recording sheet using the above corrected conversion table, the density of the image formed on the recording sheet is lowered (light in color).

To prevent the above matters, the background correction is performed in the copy machine according to this embodiment. In the background correction, based on reading signals corresponding to the background having no gradation pattern and corresponding to the gradation patterns, the reading signals corresponding to the gradation patterns are corrected.

On the other hand, there is a case where the background correction is not needed. For example, in a case where reproduced papers including a large amount of yellow component are used as the recording sheet, the conversion table by which the gradation is corrected so that the amount of yellow component is reduced is preferable.

In the copy machine according to the embodiment, the user can select whether or not the background correction should be performed.

[Correction of Conversion Table in ACC Process]

A description will now be given of the correction of the conversion table carried out by the τ-correction circuit 110 in the ACC process.

First, a relationship between writing values of the gradation patterns and reading values obtained by the scanner will be described below.

The writing values of the gradation patterns formed on the photosensitive body are represented by LD[i] (i=1, 2, ..., 10) and corresponding reading values obtained by the scanner 101 which scans the gradation pattern formed using the writing values LD[i] are represented by r[i], g[i] and b[i] (i=1, 2, ... 10).

In this embodiment, the reading values are represented using the so called RGB components. Further, the reading values may be represented using "lightness", "saturation" and "hue angle" (L*, c*, h*) or using "lightness", "redness" and "blueness" (L*, a*, b*).

Image signals for complementary colors of Y (yellow), M (magenta) and C (cyan) can be represented by b[i], g[i] and r[i]. Thus, in a case where the reading values obtained by the scanner are represented by the r[i], g[i] and b[i], the conversion table can be easily made using image signals (a[i], i=1, 2, ..., 10) for the complementary colors.

The reference data corresponds to a target of reading values obtained by the scanner 101 which scans the gradation patterns. Thus, the reference data can be represented by a set of the laser writing values LD[i] (i=1, 2, ..., 10) and target reading values (r0[i], g0[i] and b0[i]). A complementary image signal of the reference data (r0[i], g0[i] and b0[i]) is represented by a0[col][i] (0≦ni≦255, i=1, 2, ..., 10, and col=Y, M, C).

Hereinafter, for the sake of simplicity, the scanner reading values and reference data will be defined using a general and simple format.

The reading values a[LD] obtained by the scanner which reads the gradation patterns is compared with the reference data A[n] stored in the ROM 116, so that the conversion table is obtained based on the comparison result. In the above, n represents an input value to the conversion table.

The reference data A[n] is a target value for a conversion table which should be newly made. The input value n is converted into a laser writing value LD[i] using the conversion table. The gradation pattern is formed based on the laser writing value LD[i]. The gradation pattern is scanned by the scanner 101. The reference data A[n] is a target value for the reading value a[LD] obtained by the scanner 101 which scans the gradation pattern.

The reference data is divided into a part which is corrected in accordance with a density range which can be output by the printer and a part which is not corrected. It is determined, based on determination data stored in the ROM or the RAM, whether a part of the reference data should be corrected. The reference data will be described later.

The laser writing value LD corresponding to the reference data A[n] is found from the reading value a[LD] of the gradation pattern. The laser output value LD[n] corresponding to the input value n to the conversion table is then obtained. The above processes are performed for all input values 0–255 (in a case where the density of each pixel is represented by 8 bits), so that the conversion table can be found.

The above processes may be performed for discrete input values, such as ni=00h, 11h, 22h, ... and FFh (hexadecimal digits), in place of all input values (n=00h, 01h, ..., and FFh (hexadecimal digits)). In this case, for other input values, an interpolation process may be performed. A conversion table closest to the relationship represented by sets (00h,LD[00h]), (11h,LD[11h]), (22h,LD[22h]), ..., and (FFh,LD[FFh]) obtained for the above discrete input values may be selected from among the conversion tables stored in the ROM 116.

Figure 32:
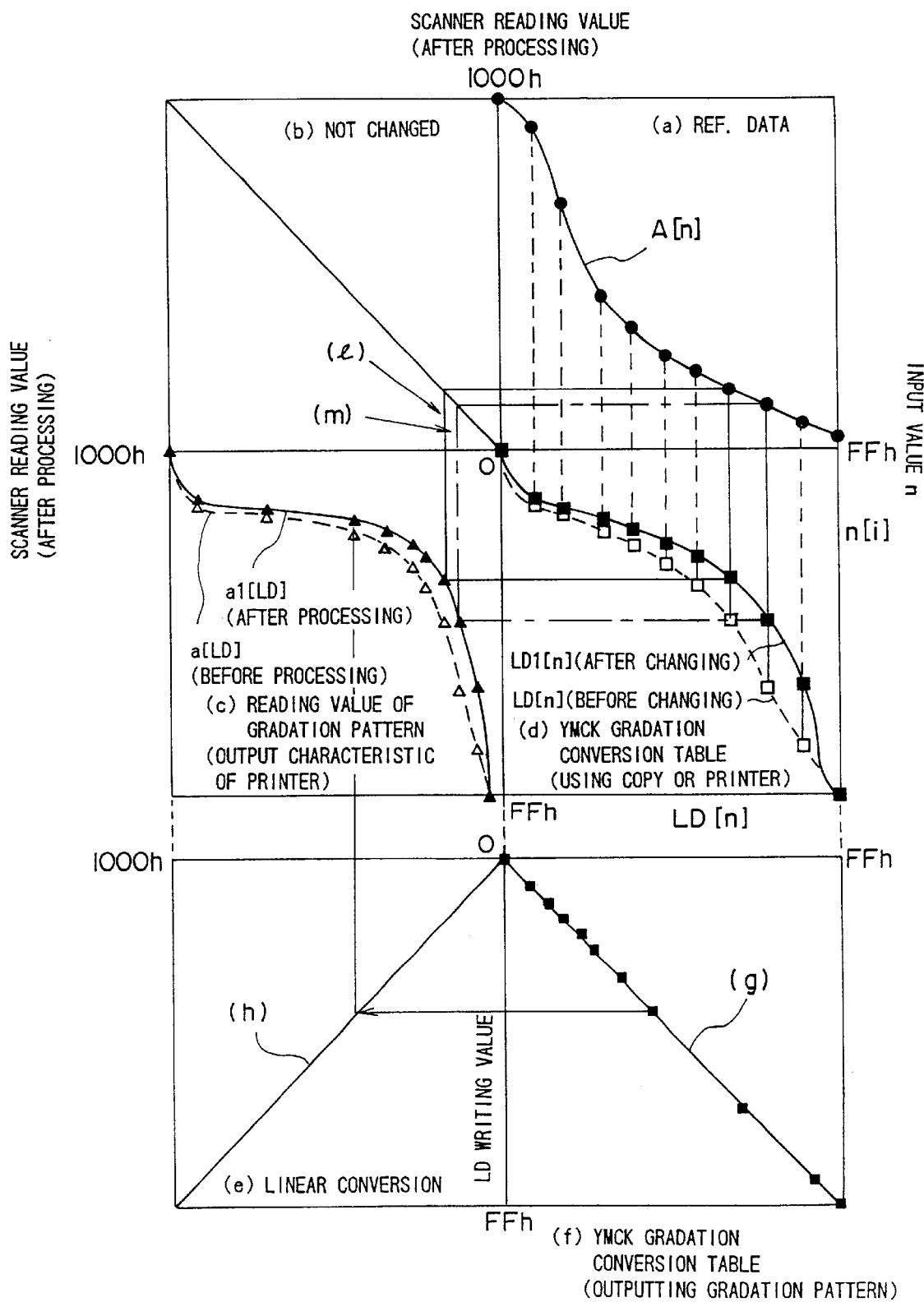
FIG. 32 is a diagram illustrating that the conversion table is corrected in the execution of the ACC.

FIG. 32 illustrates the correction of the conversion table in the ACC process.

A graph in the first quadrant (a) indicates the reference data A[n]. Abscissas in the first quadrant (a) correspond to input values n to the conversion table. Ordinates correspond to reading values by the scanner. The reading values of the scanner are values obtained by applying the RGB τ-conversion, the averaging process for few points in the gradation patterns and the summing process to values read by the scanner. In this embodiment, to improve the operation accuracy, each signal to be processed is formed of 12 bits. In FIG. 32, "AFTER PROCESSING" means a case after the above processes are completed.

The abscissas in the second quadrant (b) in FIG. 32 correspond to reading values of the scanner in the same as those in the first quadrant (a). Thus, in the second quadrant (b), both the abscissas and the ordinates correspond to reading values of the scanner. That is, the second quadrant (b) means a non-conversion process.

The graph in the third quadrant (c) indicates reading values a[LD] obtained by reading the gradation patterns. The ordinates correspond to writing values for the laser diode which writes a latent image on the photosensitive body. The abscissas correspond to the reading values of the scanner. The gradation patterns are formed based on predetermined writing values, and the gradation patterns are read by the scanner. The a[LD] represents the relationship between the writing values and the reading values of the scanner, so that the a[LD] corresponds to the output characteristic of the printer 112.

The actual writing values for the patterns has one of sixteen levels of 00h (the background), 11h, 22h, ..., EEh and FFh (hexadecimal digits). That is, the writing values are discrete. The detected values are then interpolated so that a continuous graph is obtained.

The graph in the fourth quadrant (d) indicates the conversion table LD[n]. The ordinates in the fourth quadrant (d)

correspond to writing values for laser diode (LD) which writes a latent image on the photosensitive body. The abscissas correspond to the input value n to the conversion table.

In an area (f) shown in FIG. 32, a graph (g) indicates a table for outputting writing values used to form the gradation patterns. The area (f) has the same ordinates and the abscissas as those in the fourth quadrant (d).

In an area (e) shown in FIG. 32, a graph (h) indicates a linear conversion connecting the writing values for the laser diode (LD) which writes the gradation patterns with the reading values of the scanner which reads the gradation pattern. The area (e) has the same ordinates and abscissas as those in the third quadrant (c).

Based on the relationships shown in FIG. 32, the conversion table can be corrected in the ACC process.

For example, due to deterioration of the image forming apparatus with time, the output characteristic of the image forming apparatus indicated in the third quadrant (c) shown in FIG. 32 is changed from a[LD] (indicated by a dotted line) to a1[LD] (indicated by a continuous line). In this case, based on the output characteristic and the reference data, a new conversion table indicating the relationship between the reading values of the scanner and the input values n is made. The output characteristic is the relationship between the writing values for the laser diode (LD) and the reading values of the scanner. The reference data is represented by the relationship between the reading values of the scanner and the input values to the conversion table. That is, operations are successively performed in an order indicated by an arrow m ((d)→(c)→(b)→(a)), so that the new conversion table is obtained.

The operations for obtaining the new conversion table are performed by the CPU 115 of the image processing unit 121 in accordance with control programs stored in the ROM 116. An image is formed using the new conversion table which is obtained as described above, so that the deterioration of the image forming apparatus with time can be compensated.

Figure 18:
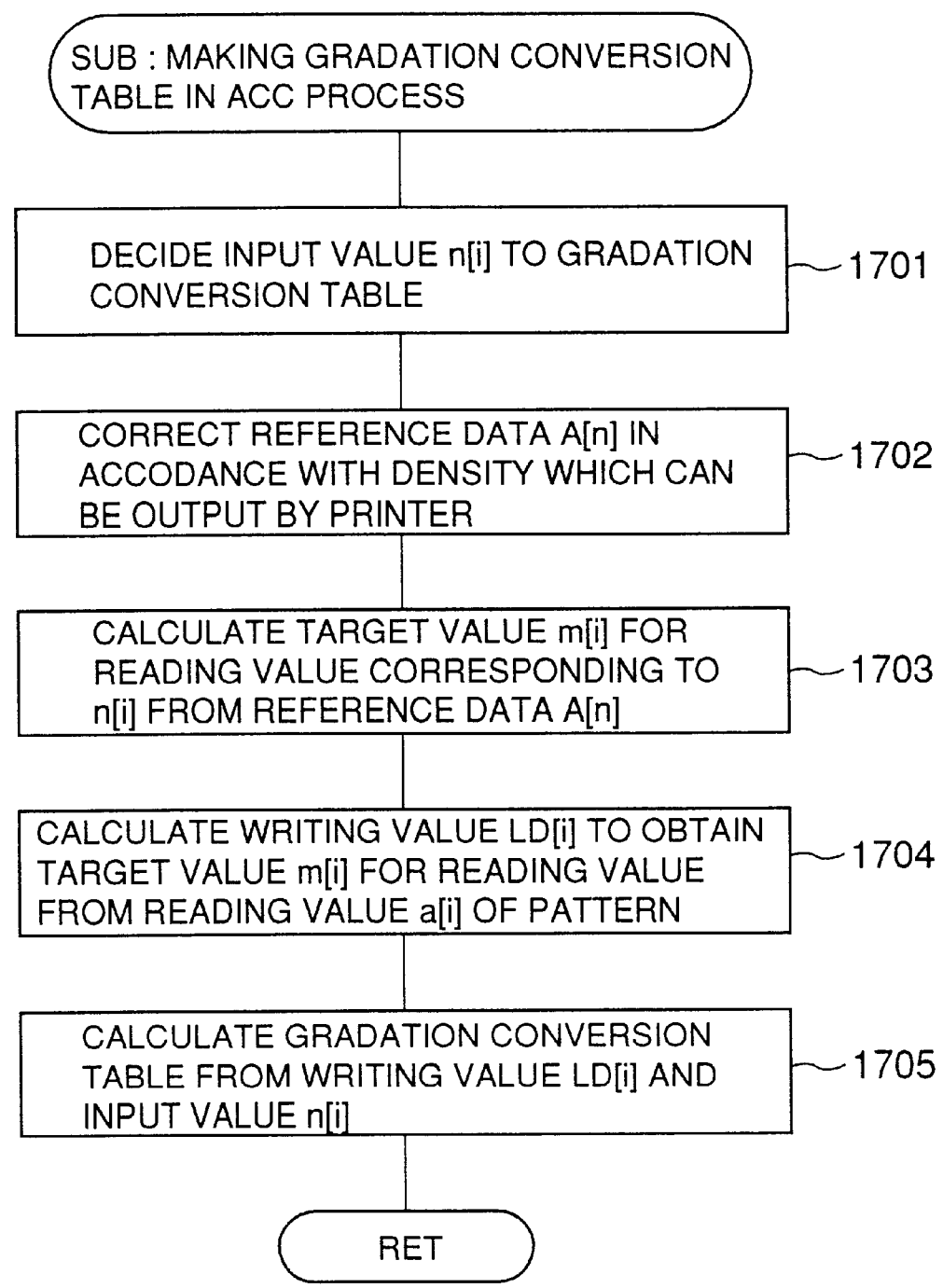
FIG. 18 is a flowchart illustrating a procedure in which a conversion table is made.

A procedure of operations for obtaining the conversion table is shown in FIG. 18.

Referring to FIG. 18, input values needed to obtain the conversion table are decided (1701). In this embodiment, the input value n[i] is represented by $$n[i]=11(h) \times i \ (i=0, 1, \ldots, imax=15).$$

The reference data A[n] is then changed in accordance with the density range which can be output by the printer (1702). Description of the change of the reference data will be given later.

The reading values m[i] of the scanner corresponding to n[i] obtained in step 1701 are obtained from the changed reference data A[n].

Actually, the reference data A[n[j]] corresponding to the discrete digits n[j] ($0 \leq n[j] < 255$, j=0,1, ... ,jmax, n[j]≦n[k] for j≦k) is obtained under a condition of n[j]≦n[i]<n[j+1], j ($0 \leq j \leq jmax$).

In a case where the input value, namely, the input image signal, is formed of 8 bits, the reference data may have been previously obtained as n[0]=0,n[jmax]=255, n[jmax+1]=n[jmax]+1 and A[jmax+1]=A[jmax] to simplify the operations. It is preferable that the interval n[i] of the reference data items is as small as possible from the viewpoint of improvement of the accuracy.

m[i] is calculated in accordance with the following equation using j obtained as described above.

$$m[i]=A[j]+(A[j+1]-A[i])\cdot(n[i]-n[j])/n[j+1]-n[j]) \tag{8}$$

Although, in this embodiment, the interpolation is performed using a linear formula, the interpolation may be performed using a higher order function or a spline function. In this case, m[i] is defined as m[i]=f(n[i]). In a case of a k-th order function, the function f is represented by the following equation.

$$f(x)=\Sigma bi \cdot xi \tag{9}$$

Next, the writing values LD[i] for the laser diode (LD) used to obtain m[i] are found (1704) in the same manner as in the step 1703.

In a case where reading values of the scanner to which the RGB τ-conversion has not been applied are processed, a[LD] decreases in accordance with the increase of the values of LD. That is, an inequality (a[LD[k]]≧a[LD[k+1]]) stands under a condition where LD[k]<LD[k+1].

In the embodiment, as the writing values LD[k] used to form the gradation pattern, ten values of 00h, 11h, 22h, ... , 66h, 88h, AAh and FFh (k=0, 1, ... , 9) are decided. In image density areas to which a small amount of toner is adhered, the variation of the reading values of the scanner with respect to the amount of toner adhered thereto is large. Thus, for this type of image density area, intervals of writing values LD[k] are relatively small. In image density areas to which a large amount of toner is adhered, the variation of the reading values of the scanner with respect to the amount of toner adhere there to is small. In addition, in this type of image density area, due to the unevenness of the amounts of adhered toner and fixed toner, the reading values do not accurately correspond to the writing values. Thus, since even if writing values are accurately decided, an image is not accurately reproduced, the intervals of writing values LD[k] are relatively large.

The intervals of the writing values LD[k] used to form the gradation patterns are set as described above, so that the amount of toner used to form the gradation patterns can be reduced in comparison with a case of constant intervals of writing values LD[k] (=00h, 11h, 22h, ... , EEh and FFh).

The writing values LD[k] for the gradation patterns are set as described above, and the extrapolation is applied to the LD[k] under a condition of a[LD[k]]≧m[i]>a[LD[k+1]], using the following linear formula, so that the LD[i] is decided.

$$LD[i]=LD[k]+(LD[k+1]-LD[k])\cdot(m[i]-a[LD[k]])/(a[LD[kmax]]-a[LD[kmax-1]]) \tag{10}$$

As has been described above, a set (n[i],LD[i]) of the input value n[i] to the conversion table and the output value LD[i] (i=0, 1, ... , 15) is obtained. Based on the sets (n[i], LD[i]) (i=0, 1, ... , 15), the interpolation is performed using the spline function so that the conversion table is obtained (1705).

A conversion table closest to the relationship represented by the set (n[i],LD[i]) may be selected from among the conversion tables stored in the ROM 116. A description will now be given, with reference to FIG. 19, of a method for selecting a conversion table from among the conversion tables stored in the ROM 116.

Figure 19:
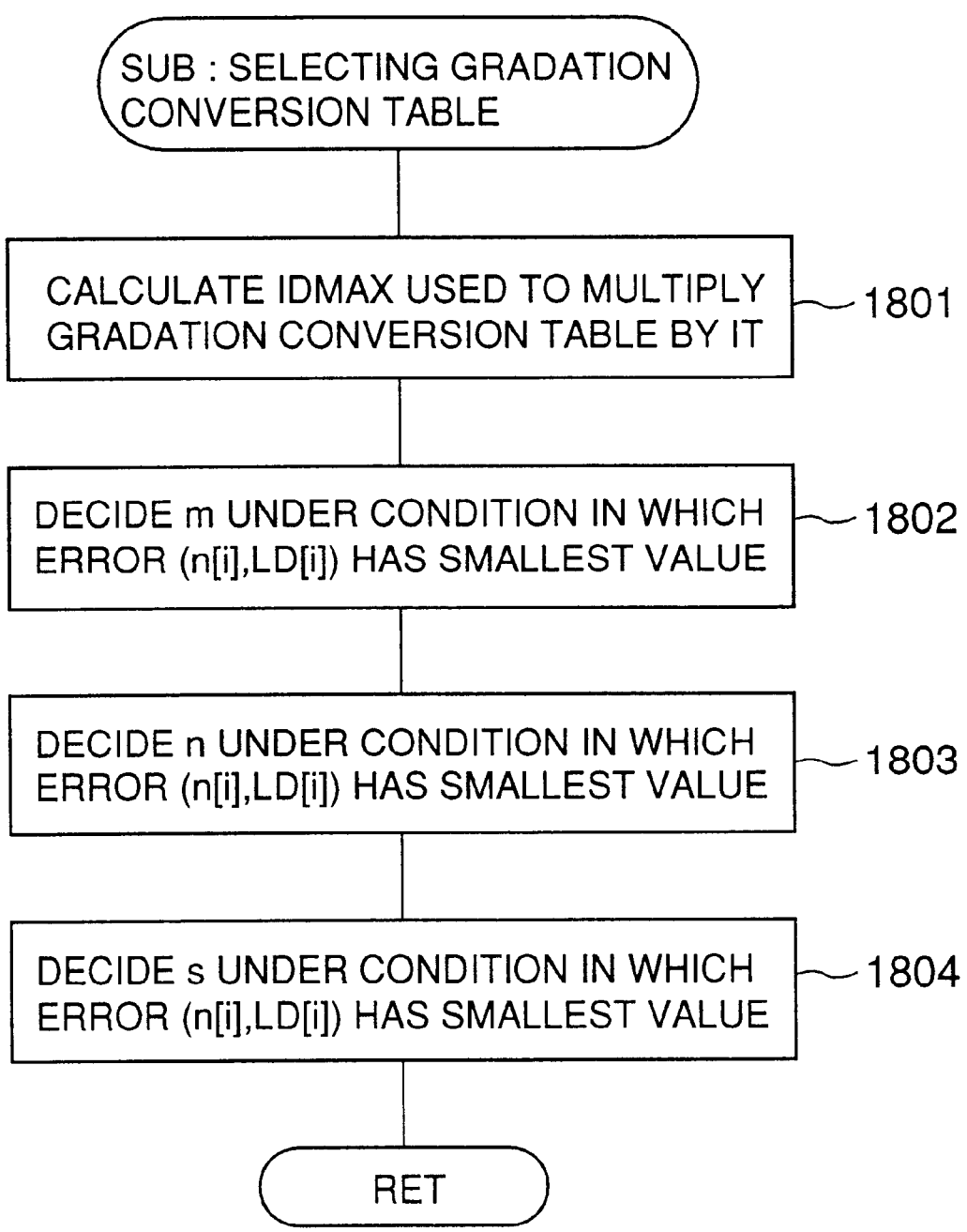
FIG. 19 is a flowchart illustrating a selecting operation for the conversion table.

Referring to FIG. 19, a coefficient IDMAX (%) which should be multiplied by the conversion table is found (1801). In a case of n[imax]=FFh, the coefficient is set at LD[imax]/FFh×100. In this embodiment, the output values LD[i] to the conversion table are changed in accordance with LD'[i]=LD[i]×100/IDMAX. Thus, to select the conversion table, it is not necessary to consider the coefficient IDMAX.

Parameters m, h, s indicating curvatures of the whole image, the highlight portion and the shadow portion are then selected. First, the curvature m of the whole image is selected (1802). The curvature m is expressed by curvature in the LIST 4 described above.

An error is calculated based on the sum of squared difference between the gradation conversion curve E[j] ($0 \leq j \leq 255$) and the output value LD[i] corresponding to the input value n[i] to the conversion table. That is, the error is given by the following equation:

$$\text{error} = \Sigma Wi \cdot (LD[i] - E[n[i]])^2 \tag{11}$$

where Wi is a weight for an input value to the i-th conversion table. The curvature m is selected so that the above error has the smallest value.

If the error in the highlight portion is large, a desired result can not be obtained. Thus, the weight Wi for the highlight portion is set at a value as large as possible so that the error is as small as possible.

In the same manner as in the above case, the curvatures h and s of the highlight portion and shadow portion are decided so that the error is the smallest (1803 and 1804).

The parameters h, m and s which are selected so that the error is the smallest and the coefficient IDMAX are used as the curvature of a new gradation conversion curve.

[Change of Reference Data]

A description will now be given of the change of the reference data in the present embodiment.

In this embodiment, there are two types of changes of the reference data. In the first type, the reference data is changed in the same manner as in the step 907 shown in FIG. 10 (or the step 1702 shown in FIG. 18). That is, the reference data is automatically changed in the ACC process. In the second type, the change of the reference data is carried out separately from the ACC process. In a case where although the conversion table is corrected in the ACC process, an image having desired quality is not obtained, the second type of change of the reference data is performed.

In the step 907 shown in FIG. 10 (in the first type of change of the reference data), the input-output characteristic of the image forming apparatus is detected, and the reference data is automatically changed based on the detected input-output characteristic. This process is carried out by the CPU 115 of the image processing unit 121 in accordance with a reference data changing program stored in the ROM 116. Thus, the CPU 115 has a function for changing the reference data which is a target used to correct the conversion table.

The process for changing the reference data in step 907 shown in FIG. 10 is performed as follows.

The writing value for the laser diode (LD) corresponding to the maximum density which can be output by the printer 112 is equal, for example, to FFh (hexadecimal digit). In this case, the reading value of the gradation pattern is equal to m[FFh]. This reading value m[FFh) is represented by mmax.

The reference data which is not corrected in a range between the lower density and the medium density is represented by A[i] (i=1, 2, . . . , i1), the reference data which is not corrected in a range of the higher density is represented by A[i] (i=i2+1, . . . , imax−1)(i2≧i1, i2≧imax−1), and the reference data which should be corrected is represented by A[i] (i=i+1, . . . , i2).

Hereinafter, a description will be given of a procedure of operations using the reading values of the scanner which is processed by the RGB τ-conversion, namely, the reading values of the scanner corresponding to the reflectivity on the original.

The difference Δref between the reference data A[i2+1] and the reference data A[i1] is calculated in accordance with the following equation.

$$\Delta ref = A[i1] - A[i2+1] \tag{12}$$

The reference data A[i2+1] corresponds to the lowest density in the range of the higher density, and the reference data A[i1] corresponds to the lowest density in the range between the lower density.

In a case where the RGB τ-conversion for converting the reflectivity data into the lightness data is not performed, the difference Δref is positive (Δref>0).

Using the maximum density mmax which can be output by the printer 112, the difference Δdet is calculated in accordance with the following equation.

$$\Delta det = A[i1] - m\text{max} \tag{13}$$

According to the above formulas (12) and (13), the reference data A[i] (i=i1+1, . . . , i2) which is changed after the higher density portion is corrected is represented by the following equation.

$$A[i] = \Delta i1 + (A[i] - A[i1]) \times (\Delta det/\Delta ref)(i=i1+1, i1+2, \ldots, i2-1, i2)\tag{14}$$

The reference data is changed as described above, so that the input-output characteristic of the printer is compensated and the conversion table can be corrected in the ACC process. As a result, the quality of an image formed using the corrected conversion table is improved.

A description will now be given, with reference to FIG. 20, of the change of the reference data preformed separately from the ACC process.

First, the ACC process is carried out. That is, using the reference data stored in the storage means, the conversion table is corrected so that the output characteristic of the image forming apparatus (1901). The reference data used in the ACC process is represented by (n[i], A[i]).

In a case where although the conversion table suitable for the output characteristic is used, a desired image is not obtained, the reference data which is a target for the correction of the conversion table is not suitable. Thus, it is necessary to further change the reference data.

In the present invention, the reference data is not directly changed, but the conversion table is changed so that the reference data is indirectly changed.

The corrected conversion table obtained in the step 1901 is referred to as the conversion table B: (n[j], LD[j]) ($0 \leq j \leq 255$). This conversion table B can be changed in accordance with manual operations of the touch panel 251 of the copy machine 201. In this case, the screen of the touch panel 251 is formed as shown in FIG. 33. Referring to FIG. 33, buttons (A) are operated to change the conversion table. For example, in a case where the quality of a yellow high density portion is changed, a button (B) is operated so that the conversion table is changed (1902). The new conversion table to which the conversion table B is changed is referred to as a conversion table C: (k,LD1[k]) ($0 \leq k \leq 255$).

In this state, on the liquid crystal screen 251 shown in FIG. 12, an "UPDATING TARGET" key in the copying operation (or the printing operation) is operated (1903). Due to this operation, the CPU 115 of the image processing unit 121 changes the reference data based on the conversion table C and stores the changed reference data in the RAM 117, in accordance with the reference data conversion program stored in the ROM 116 (1904 and 1905). That is, the CPU 115 of the image processing unit 121 has a function for changing the reference data which is the target data used to correct the conversion table. As has been described above, instructions for changing the reference data are input by the operation of the touch panel 251. That is, the touch panel 251 has a function for instructing to change the reference data.

A description will now be given, with reference to FIG. 17, of a procedure in accordance with which new reference data is obtained.

Figure 17:
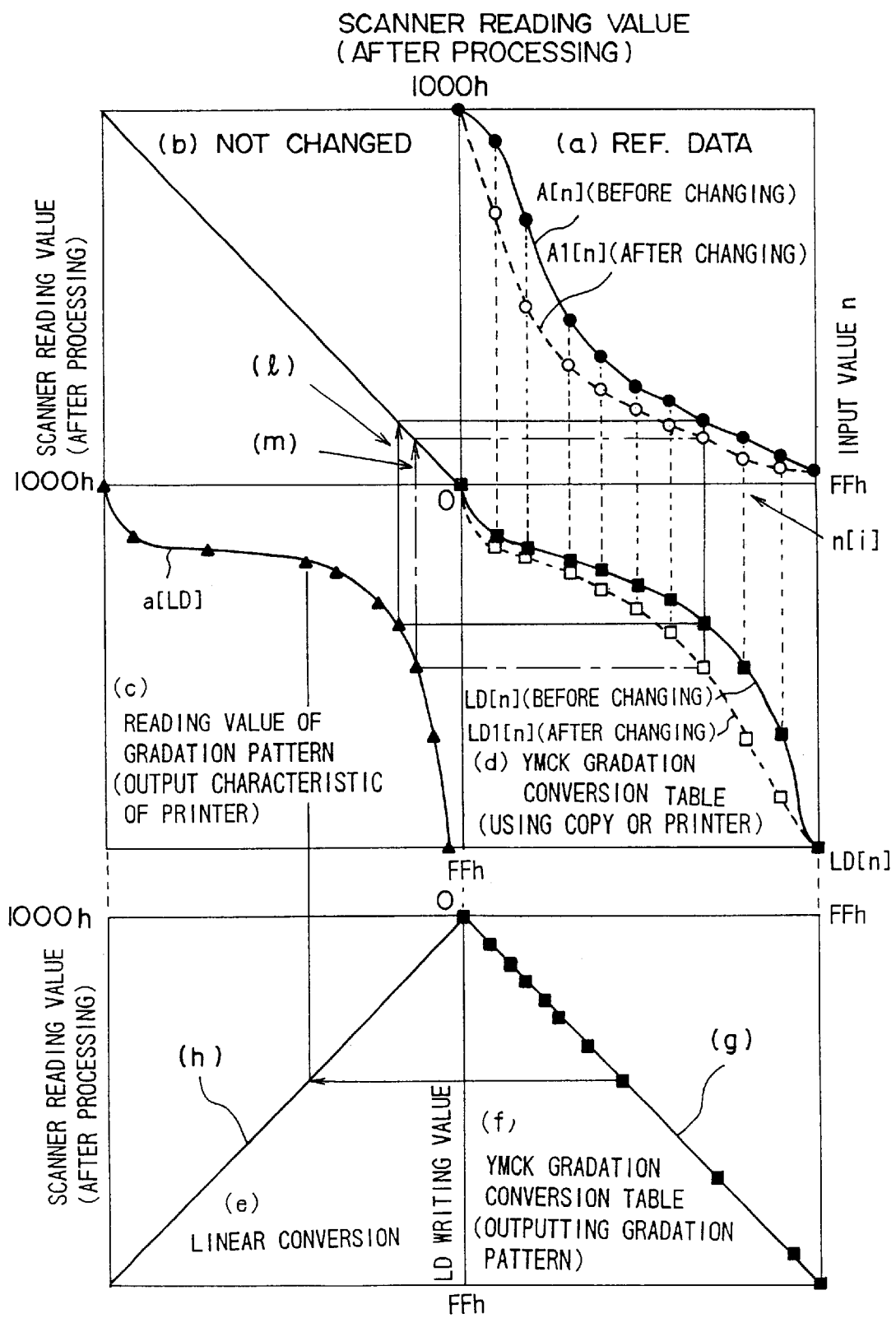
FIG. 17 is a diagram illustrating a procedure in which reference data is converted.

FIG. 17 shows the same ordinates and abscissas as those shown in FIG. 32.

As has been described above, the reference data which has not yet been converted is represented by (n[i], A[n[i]]). In FIG. 17, this type of reference data is indicated by the continuous line. The conversion table B which is obtained using this reference data in the ACC process is represented by (n[j], LD[j]) ($0 \leq j \leq 255$), as has been described above.

At a time immediately after the ACC process has been performed, the input-output characteristic of the image forming apparatus may not deteriorate with time. Thus, the input-output characteristic of the image forming apparatusis uniquely decided as shown in the third quadrant (c) in FIG. 17.

The operations are performed in an order shown by the arrow m ((d)→(c)→(b)→(a)), using the converted conversion table C (indicated by a dotted line in the fourth quadrant (d) in FIG. 17) and the input-output characteristic. The conversion table C indicates the relationship between the input values and the writing values for the laser diode (LD), and the input-output characteristic indicates the relationship between the writing values for the laser diode (LD) and the reading values of the scanner. Due to the above operations, new reference data indicating the relationship between the reading values of the scanner and the input values to the conversion table is obtained.

That is, the reference data to which the reference data (n[i], A[n[i]]) is changed is represented, using the same input value n[i] and the reading value A1[n[i]] of the scanner with respect to the input value n(i), by (n[i], A1[n[i]]). The new reference data (n[i], A1[n[i]]) is stored in the RAM 117.

After the new reference data is obtained, the conversion table is corrected using the new reference data in the ACC process.

Figure 20:
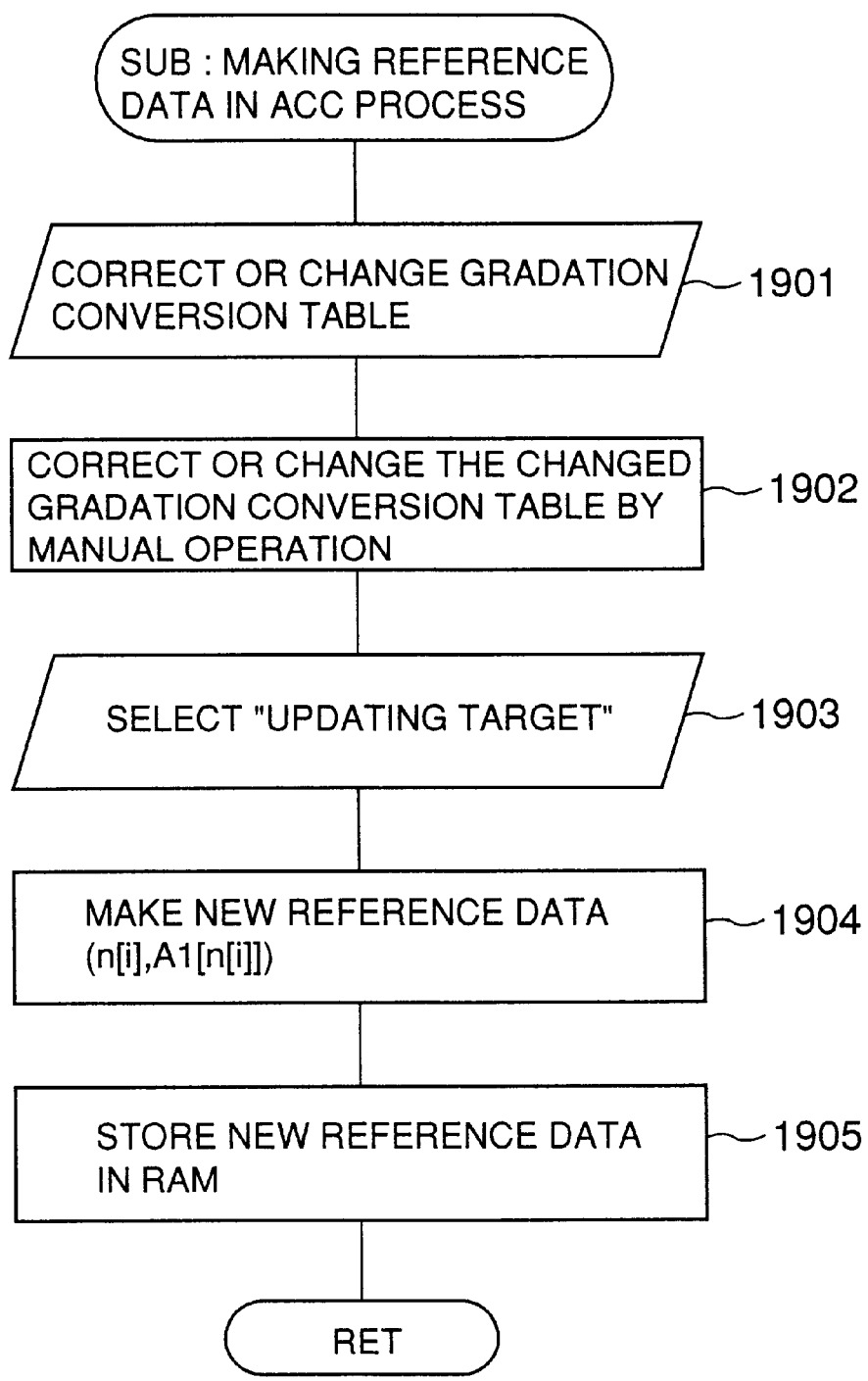
FIG. 20 is a flowchart illustrating a process for change the reference data after an ACC is executed.

If an image having a desired quality is not obtained by the above processes based on a single operation of the touch panel 251, the process shown in FIG. 20 is repeatedly performed in accordance with operations of the touch panel 251. As a result, the reference data is changed bit by bit, so that an image having a desired quality can be obtained.

In a case where the image forming apparatus is connected to a host computer, the instructions for changing the reference data can be supplied from the host computer to the image forming apparatus by on-line operations.

In the embodiment described above, to form the gradation patterns in the ACC process, the specific writing values for the laser diode (LD) are obtained using the specific table as indicated by (g) in FIG. 17 or FIG. 32. The gradation patterns are formed based on the specific writing values. The gradation patterns are then read by scanner, and the ACC process is performed using the reading result (the reading values) obtained by the scanner.

In this case, the reading values of the gradation patterns are represented by the input-output characteristic which is the relationship between the writing values for the laser diode (LD) (the ordinates in the third quadrant (c) in FIG. 17) and the reading values of the scanner (the abscissas in the third quadrant (c) in FIG. 17).

On the other hand, when the gradation patterns are formed in the ACC process, the conversion table can be used.

A description will now be given with reference to FIG. 21, of this matter.

Figure 21:
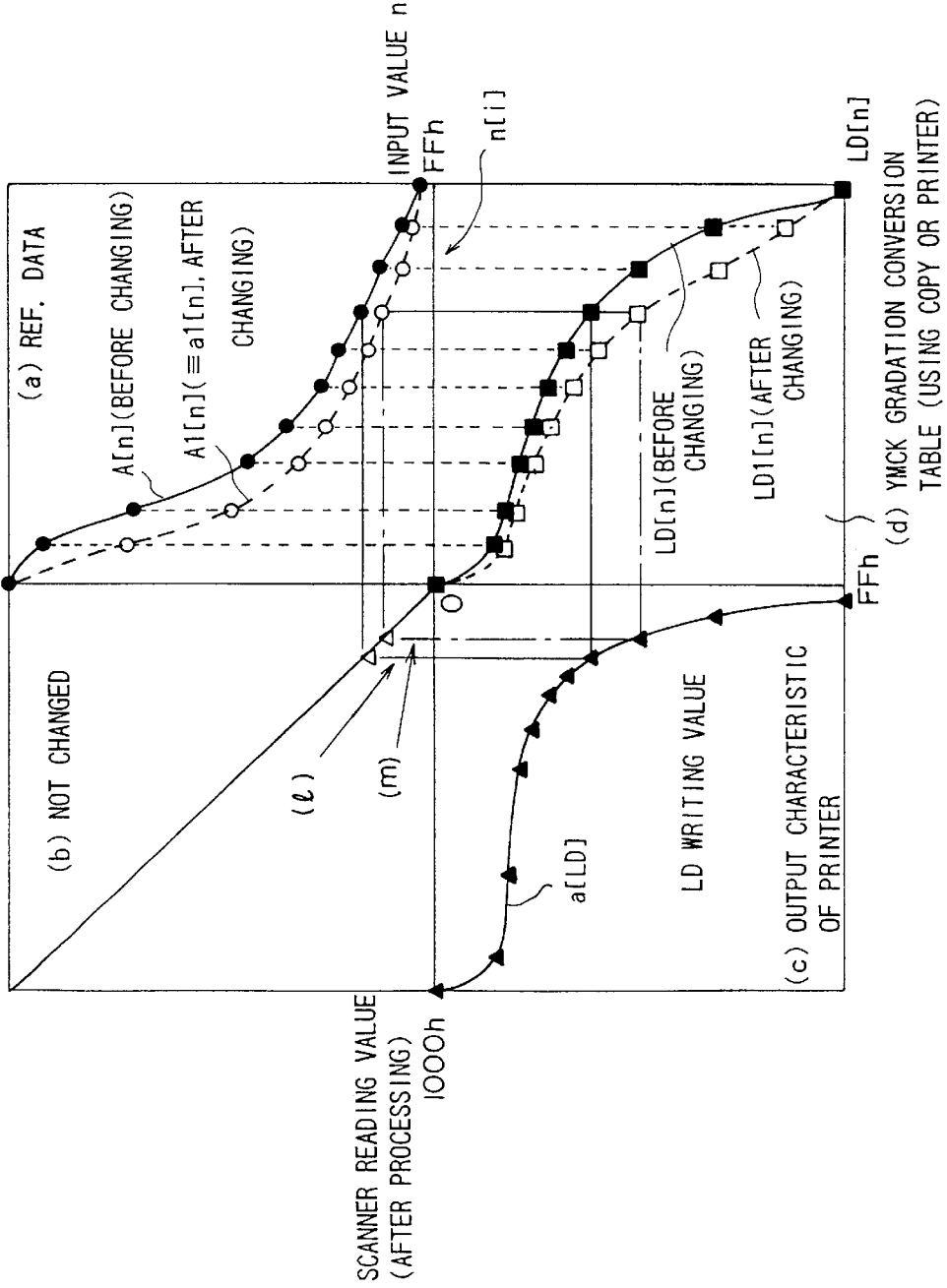
FIG. 21 is a diagram illustrating relationships among the reference data, the conversion table and the gradation pattern in a case where the gradation pattern is formed using the conversion table.

To obtain writing values for the gradation patterns, the conversion table indicated in the fourth quadrant (d) in FIG. 21 may be used. In this case, the reading values of the gradation patterns corresponds to the relationship between input values to the conversion table (the abscissas in the first quadrant (a)) and the reading values of the scanner (the ordinates in the first quadrant (a)). Thus, if the conversion table for the gradation patterns reflects the reference data, the relationship between the input values input to the conversion table to form the gradation patterns and reading values obtained by reading the gradation patterns formed based on the writing values into which the input values are converted by the conversion table corresponds to the reference data.

A description will now be given, with reference to FIG. 22, of a procedure for making the reference data in a case where the conversion table is used to form the gradation patterns.

Figure 22:
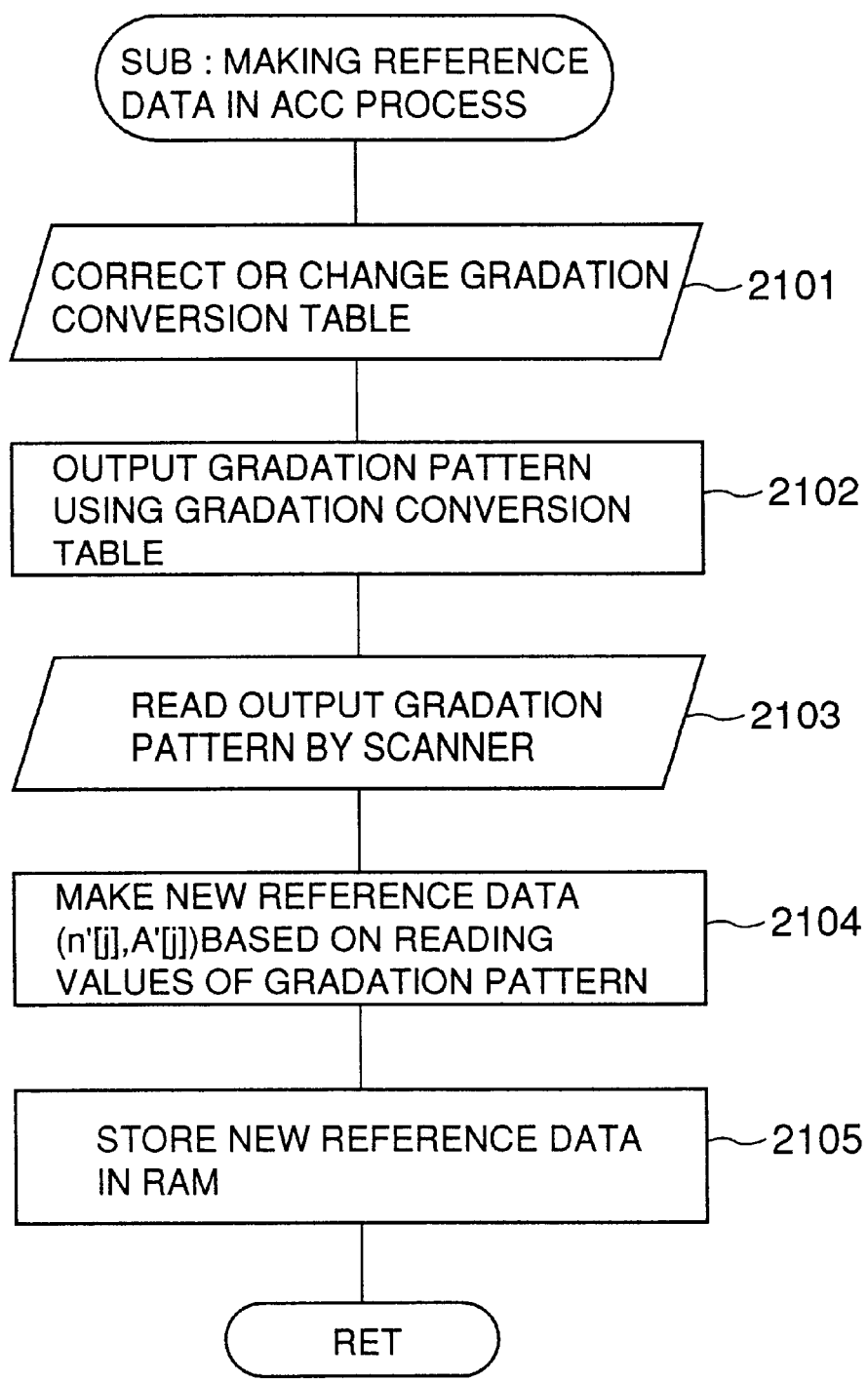
FIG. 22 is a flowchart illustrating a procedure for making the reference data in the case where the gradation pattern is formed using the conversion table.

Referring to FIG. 22, the conversion table B obtained in the ACC process as has been described above with reference to FIG. 20 is converted into the conversion table C in accordance with the manual operations or the on-line operations (2101). The conversion table C is represented by (i, LD[i]).

After this, the gradation patterns are formed using the conversion table C (2102). The gradation patterns are read by the scanner (2103). The reading values of the scanner which reads the gradation patterns are represented by a[i]. That is, the reading values corresponding to the writing values for the laser diode (LD) in the conversion table are represented by a[i] (i=1, 2, . . . , n). n is a number decided for every gradation level. The number n is set, for example, at 10 (n=10).

The reference data which has not yet been changed is represented by the relationship between the abscissas n[i] and the ordinates A[i] in the first quadrant shown in FIG. 21. The writing values for the laser diode (LD) obtained from the conversion table C to which the input values n[i] are supplied are represented by LD[n[i]]. Because the conversion table C (i, LD[i]) is represented as a function which outputs the writing values LD[i] with respect to the input values i.

In the first quadrant shown in FIG. 21, ordinates (input values) for the reference data which has not yet been changed (indicated by a continuous line) and for the changed reference data (indicated by a dotted line) are uniform. In this case, if the changed reference data is represented by (n'[j], A'[j]), the following equalities: n'[j]=n[i] and A'[j]=a[i], stand. As a result, the changed reference data can be represented, as the relationship between the input values n[i] and the reading values a[i], by (n[i], a[i]). The changed reference data (n'[j], A'[j]) which are obtained as described above are stored in the RAM 117 (2104, 2105).

In the above case, the gradation patterns are formed using the conversion table C. The input values n[i] corresponding to the reading values a[i] obtained by reading the gradation patterns and the abscissas (the input values) of the reference data which has not yet been changed are uniform. As a result, the changed reference data is obtained.

Next, a description will now be given of a case where the reading values A'[j] (=a[i]) of the changed reference data and the reading values A[n[i]] of the reference data (n[i], An[i]]) which has not yet been changed are uniform. That is, a description will now be given of how to decide the changed reference data in a case where the ordinates for the changed reference data and the reference data which has not yet been changed are uniform. In the case where the ordinates are uniform like this, the input values of the changed reference data differ from the input values of the reference data which has not yet been changed.

The equality (A'[i]=A[i]) stands. The a[i] (i=1, 2, ..., 10) of the reading values (LD[i], a[i]) of scanner which reads the gradation patterns are interpolated, so that the reading values LD'[i] needed to obtain the a[i] are found.

For example, the reading values LD'[i] are found in accordance with the linear interpolation as follows.

When an inequality a[k]≦A[i]≦a[''k+1] (k=1,2, ..., n) stands, the reading values LD'[i] is defined as $$LD'[i]=LD[k]+(LD[k+1]-LD[k])/(a[k+1]-a[k])\times(A[i]-a[k])$$

The input value j to the conversion table C (i, LD[i]) (i=1, 2, ..., 255) which satisfies LD'[i]=LD[j] is calculated, and the input value j is defined as n[i]=j.

The changed reference data is represented by (n[j], A[i]) obtained as described above.

Figure 23:
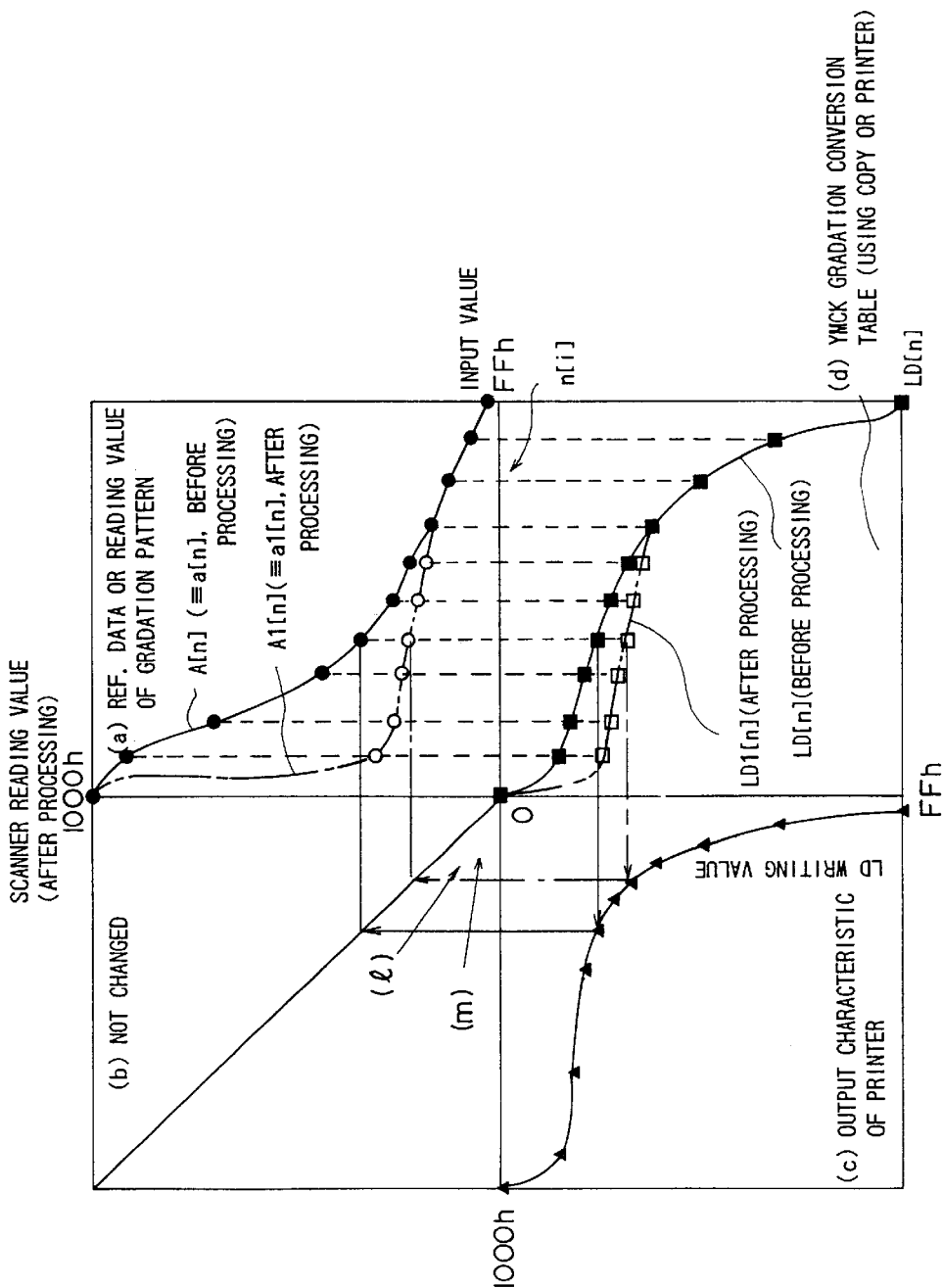
FIG. 23 is a diagram illustrating a case where a lower density area of the reference data is partially corrected.
Figure 24:
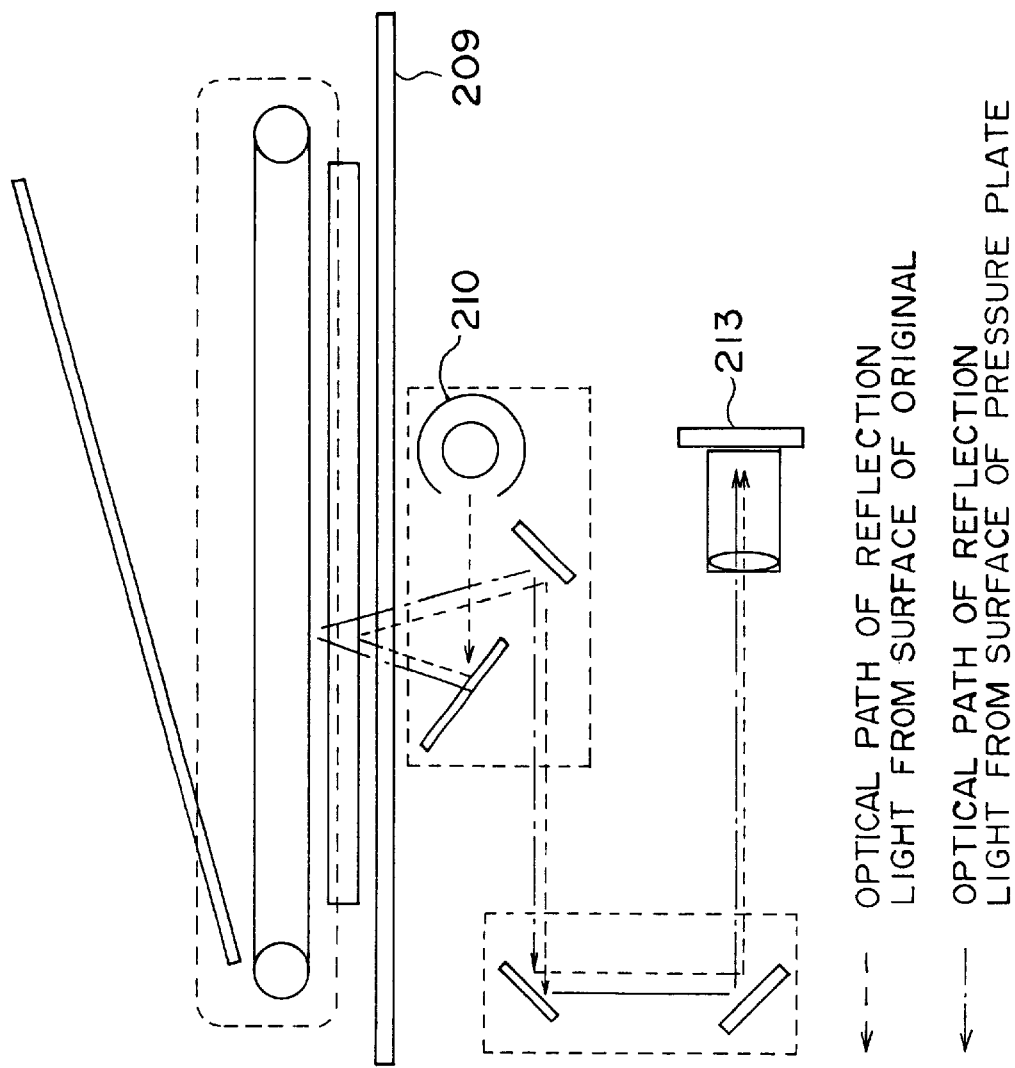
FIG. 24 is a diagram illustrating that the original cover affects an image read by a scanner.

A case where a lower density part of the reference data is changed is shown in FIG. 23. FIG. 23 shows the same axes of ordinates and abscissas as FIGS. 17 and 21. A partial change of the reference data as shown in FIG. 23 can be performed in accordance with instructions from instruction means (the touch panel). For example, keys (B) shown in FIG. 33 are operated, so that only a yellow part of the reference data can be changed.

In the present embodiment, the conversion table is changed so that the reference data is indirectly changed. The curvatures of the gradation conversion curve as shown in FIGS. 6 and 7 are partially changed, and the change reflects the reference data.

FIG. 23 shows a case where only the lower density part of the reference data is changed. However, only a higher density part and both the lower density part and the higher density part of the reference data can be changed. Further, a medium density part between the lower density part and the higher density part can be corrected.

[Background Correction]

A description will now be given of the background correction.

Referring to FIG. 23, light emitted from an exposure lamp 210 (e.g., a halogen lamp) is divided into two light beams. One light beam is reflected by the surface of an original and incident to the CCD sensor via a first, second and third mirrors. Another light beam passes through the original and is reflected by the surface of the pressure plate which presses the original on the contact glass. The light beam reflected by the surface of the pressure plate is incident to the CCD sensor via the first, second and the third mirrors. If the surface of the pressure plate has a large reflectivity, the amount of light incident to the CCD sensor is increased. On the other hand, if the surface of the pressure plate has a small reflectivity, the amount of light incident to the CCD sensor is decreased. In a case where a large amount of light is incident to the CCD sensor, it is determined that the original set on the contact glass has a lower density. In a case where a small amount of light is incident to the CCD sensor, it is determined that the original set on the contact glass has a higher density.

The pressure plate is generally made of plastic or has a plate coated with vinyl. In another case where an auto original feed unit is mounted on the contact glass, a feed belt for feeding originals is used as the pressure plate. The reflectivity of the above pressure plate differs from that of the feed belt. As a result, reading values of the scanner which scans the recording sheet on which the gradation patterns are formed are varied in the above two cases.

When the same gradation patterns are read, the reading values corresponding to the same density should be obtained and the same conversion table should be made. However, since bodies (the pressure plate and the auto original feed unit) provided on the original (a recording sheet on which the gradation pattern is formed) have different reflectivities, the density of an image read by the scanner is varied in accordance with the types of bodies provided on the original. As a result, different conversion tables may be made based on the same gradation patterns. Thus, the gradationability of an image formed on a recording sheet using the conversion table may not be stable.

The computer can always supply the same image data to both a machine on which the auto original feed unit is provided and a machine on which the pressure plate is provided. Thus, an image having the same gradationability must be formed in any machine to which the same image data is supplied from the computer. However, as has been described above, due to the variation of the reflectivity of the body provided on the original, even if an image is corrected based on the same gradation patterns which are scanned by the scanner, the gradationability of the corrected image may not be stable.

To eliminate the above problem, the background correction is performed. In the background correction, reading value of images are corrected based on reading values of the background of the recording sheet on which the images (the gradation patters) are formed. The background of a recording medium on which images are formed is a portion other than a portion having the images.

A description will now be given of the correction of the reading values of the gradation patterns based on the reading values of the background (the background correction).

Figure 30:
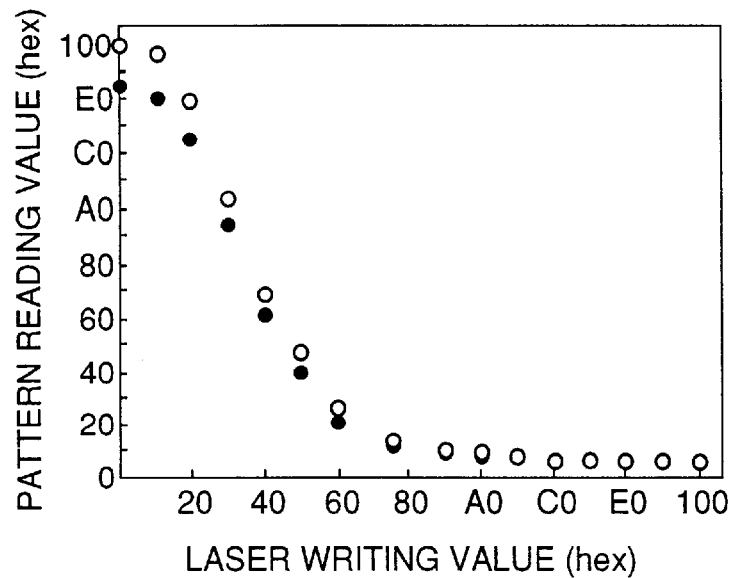
FIG. 30 is a diagram illustrating relationships between writing values for a laser diode which forms the gradation pattern and reading values of the gradation pattern.

FIG. 30 indicates the relationship between the writing values for the laser diode (LD) used to write the gradation pattern and the reading values of the gradation patterns formed on a recording sheet. The reading values on the axis of ordinates in FIG. 30 indicates values which are not τ-corrected by the RGB τ-correction circuit 103.

In FIG. 30, ● indicates the relationship in a case where a black sheet is set on the back of the recording sheet on which the gradation pattern is formed. ○ indicates the relationship in a case where a white sheet is set on the back of the recording sheet. As shown in FIG. 30, due to the difference between the reflectivities of the sheets set on the back of the recording sheet, the reading values, mainly in a lower density portion to which a small amount of toner is adhered, differs from each other.

Figure 31:
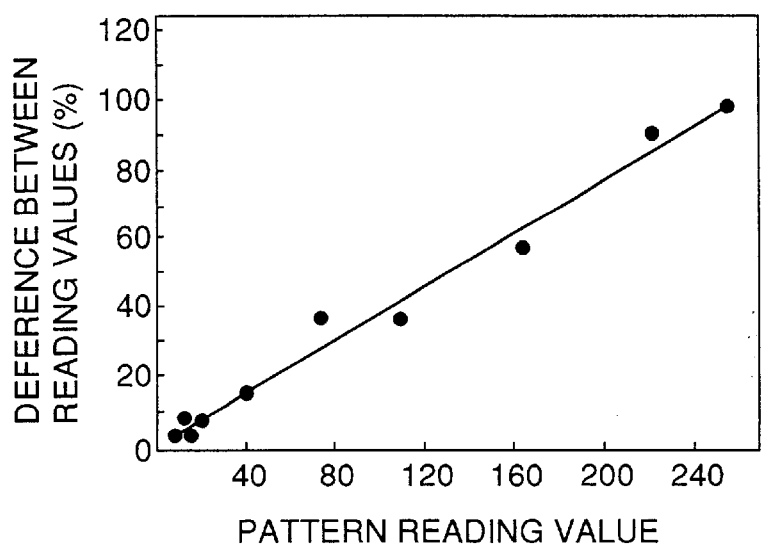
FIG. 31 is a diagram illustrating a concept in which the image signal conversion table is corrected.

In FIG. 31, the difference between the reading values in the case where the white sheet set on the back of the recording sheet and the case where the black sheet set on the back of the recording are plotted with respect to the reading values in the case where the black paper is set on the back of the recording sheet. The difference between the reading values of the backgrounds of the recording sheets on which the white paper and the black paper are respectively set are decided at 100% (the writing value is zero).

The reading values obtained by reading the recording sheet on which the patterns are formed using writing values for the laser diode (LD), on the back of which the recording sheet the black sheet is set, is represented by ak[LD]. The reading values obtained by reading recording sheet, on the back of which the white sheet is set, is represented by aw[LD]. In this case, the ordinates and the abscissas in FIG. 31 are indicated as follows.

ORDINATES:ak[LD](≡x[LD])
ABSCISSAS:(aw[LD]−ak[LD])

$$/(aw[0]-ak[0])\times 100 \ (=y[LD]) \ [\%] \tag{15}$$

Thus, the ordinates correspond to the rate of the black sheet, set on the back of the recording sheet, affecting the reading values. As shown in FIG. 31, the plotted results (the ordinates) are linear with respect to the reading values (the abscissas). Thus, the following equality;

$$y[LD][\%]=b \cdot x[LD]+c \tag{16}$$

stands, where b is an inclination and c is an intercept.

The reading value of the scanner reading the background of the recording sheet on which the gradation pattern is formed is represented by a[0]. The reading value obtained by reading the gradation patterns which are formed based on the writing values for the laser diode (LD) is represented by a[LD]. The reading value obtained by reading the background of a white paper used as the recording sheet on which the gradation pattern should be formed is represented by aw[0]. The following equality (17) can be obtained from the above equalities (15) and (16).

$$(aw[LD]-a[LD])/(d-a[0]) \times 100 = b \cdot a[LD]+c \tag{17}$$

The data aw[LD] which is actually used to make the conversion table can be found using the following equality (18).

$$aw[LD]=(b-a[LD]+c) \cdot (d-a[0])/100+a[LD] \tag{18}$$

The above constants b, c and d are stored in the ROM 116, so that the data aw[LD] can be calculated based on the reading values a[0] of the background of the recording sheet and the reading values a[LD] of the gradation pattern in any case. The conversion table and the reference data are made using the calculated data aw[LD], the reference data regardless of the background data can be obtained.

[Reference Data Made By External Unit]

A description will now be given of a case where the reference data is made or corrected by an external unit 300 and the reference data is stored in the RAM mounted in the copy machine 201 which is the image forming apparatus.

Figure 25:
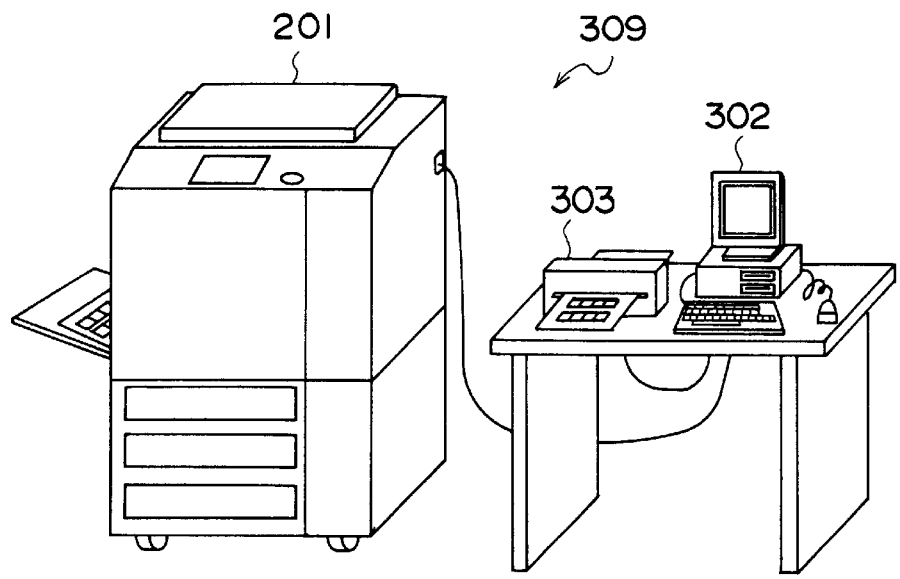
FIG. 25 is an external appearance diagram illustrating a system in which the copy machine is coupled to an external unit having a density measuring device and a computer.
Figure 26:
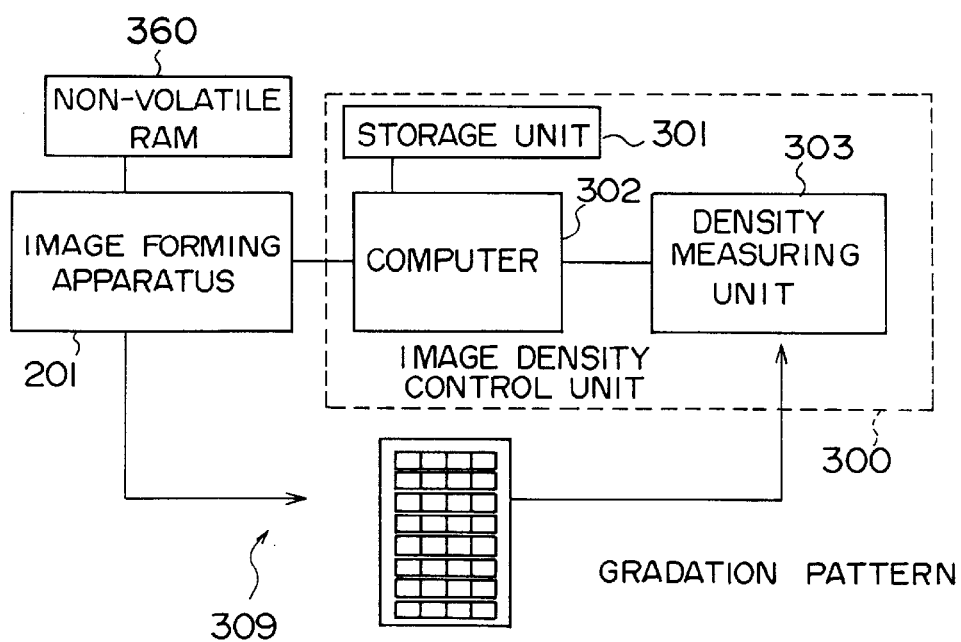
FIG. 26 is a block diagram illustrating blocks of the system shown in FIG. 25.

FIG. 25 shows an exterior view of an image processing system 309 in which the image forming apparatus and an image density control unit which is the external unit are connected by communication means. FIG. 26 shows functional blocks of the image processing system.

In the image processing system 309, the image density control unit 300 has a density measuring unit 303 and a computer 302. The computer 302 processes various types of data and controls the density measuring unit 303. The density measuring unit 303 and the computer 302 are connected so as to be communicated with each other.

The reference data is made by the image density control unit 300 and transmitted to the image forming apparatus 201. The reference data is then stored in a non-volatile RAM 306 mounted in the image forming apparatus. The reference data stored in the non-volatile RAM 306 is transmitted to the image processing unit 121 after the power supply of the image forming apparatus 101 is turned on. The reference data is then stored in the RAM 117 mounted in the image processing unit 121. The reference data stored in the RAM 117 is used in the ACC process. The image density measuring unit has the known structure.

Figure 27:
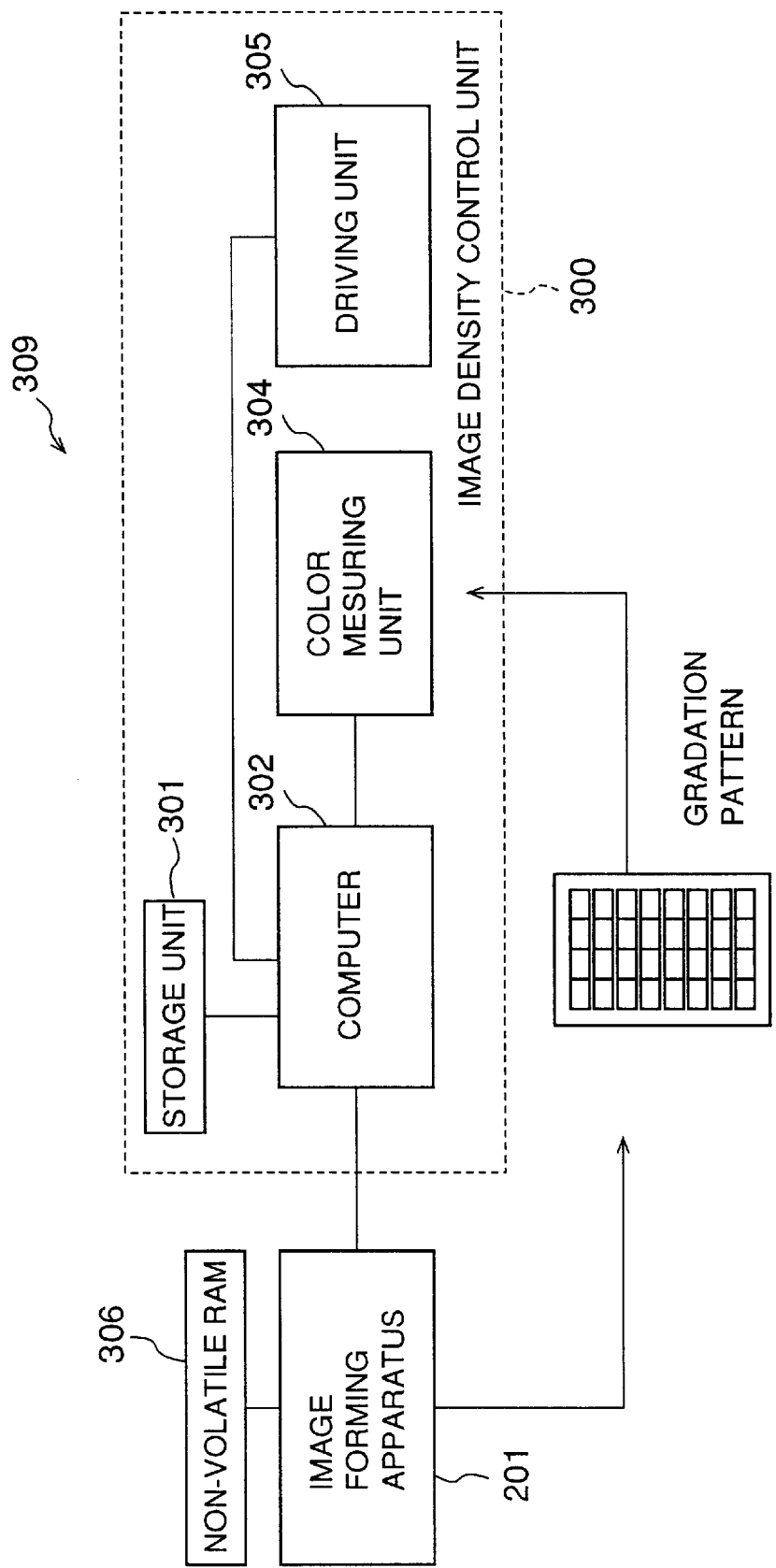
FIG. 27 is a block diagram illustrating an image processing system having a color measuring unit.

FIG. 27 shows another example of the image processing system. The image processing system shown in FIG. 27 has color measuring unit 304 and a driving unit 305 in place of the image density measuring unit 303 shown in FIG. 26. The driving unit 305 drives at least one of the color measuring unit 304 and the recording sheet on which the gradation pattern is formed. The driving unit 305 is used to move the color measuring unit 304, so that the gradation pattern can be easily measured. The driving unit 305 is not essential to the image processing system 309.

It is preferable that the color measuring unit 304 converts the reflectivity on the original into the density. A unit which converts measuring results in the color system, such as L*a*b* or XYZ, into the density may be used as the color measuring unit 304. In this case, it is necessary for the image forming apparatus to have a sufficient S/N ratio to detect the variation of the density of the gradation patterns formed by the image forming apparatus.

Figure 28:
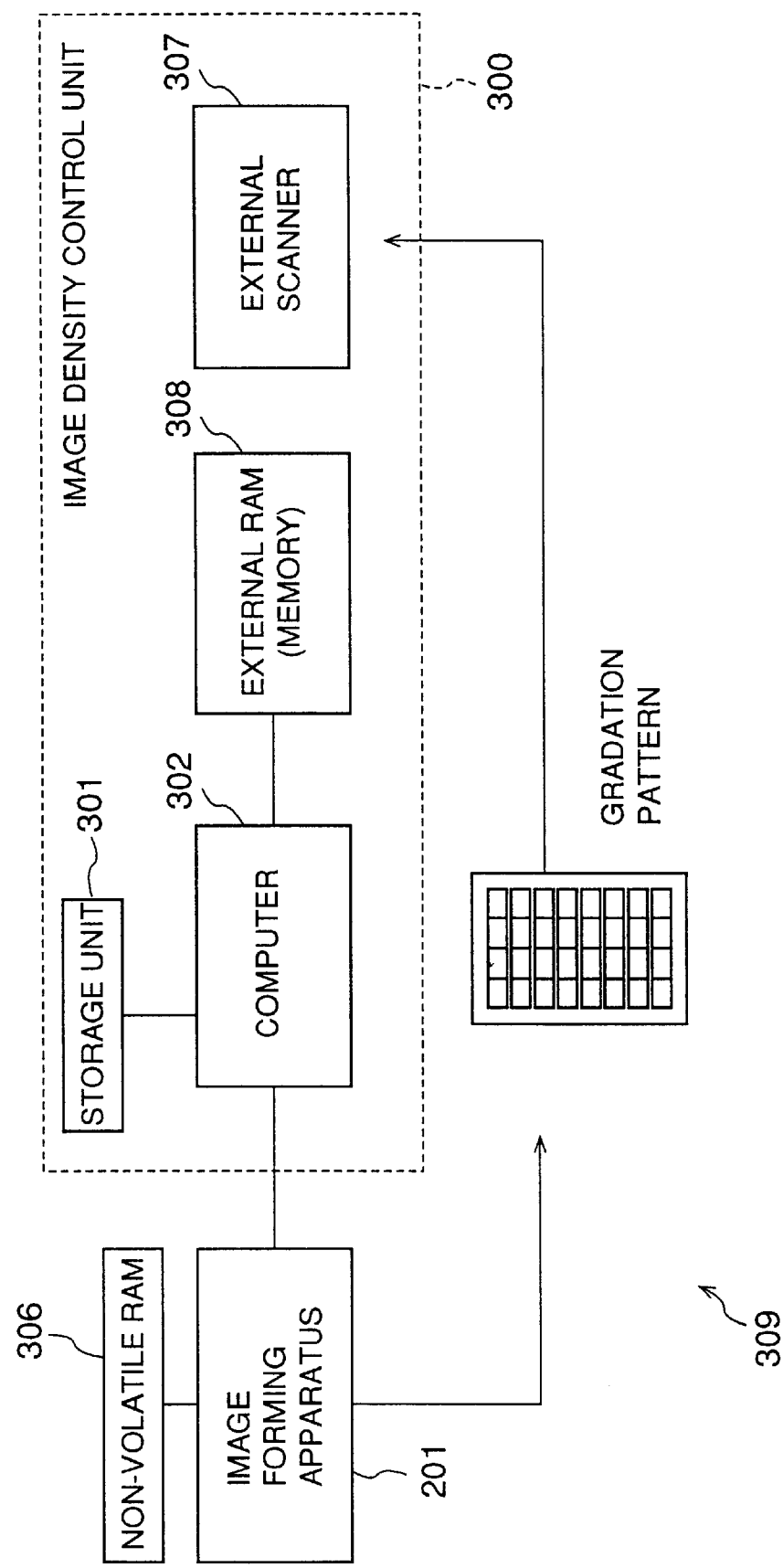
FIG. 28 is a block diagram illustrating the image processing system having an external scanner.

FIG. 28 shows the image processing system having an external scanner 307 in place of the density measuring unit described above. In a case where the external scanner 307 is used, a memory in which image data should be stored is needed. As the memory, an external RM 308 may be used as shown in FIG. 28, or an internal memory of the computer 302 may be used.

According to the image processing unit as has been described above, the image density control unit corrects the reference data based on the density data obtained by reading the recording sheet on which the gradation pattern is formed, in the same manner as the image forming apparatus described above. A new conversion table is made based on the reference data corrected by the image density control unit. The conversion table is stored in the RAM 117 in the image processing unit 121 of the image forming apparatus.

The scanner provided in the image forming apparatus can be substituted for the external scanner 307. In this case, the gradation pattern is read by the scanner 101 of the image forming apparatus, and the reading values are down-loaded into the image density control unit. Processes in this case are performed in accordance with a procedure shown in FIG. 29.

Figure 29:
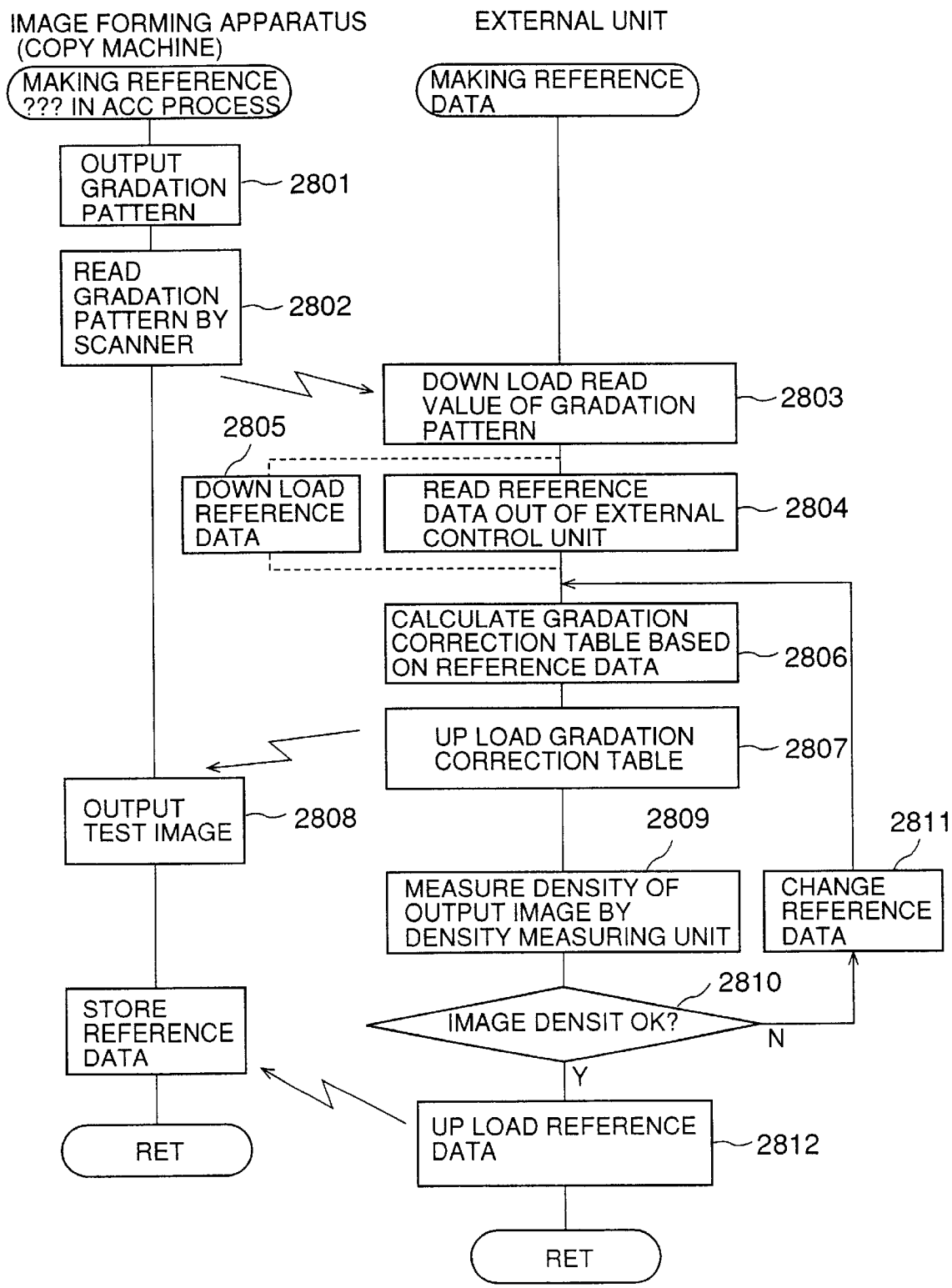
FIG. 29 is a flowchart illustrating a process for correcting the reference data by an external unit in the execution of the ACC and making a new conversion table.

Referring to FIG. 29, first, the ACC gradation patterns are output in the image forming apparatus (2801). The gradation patterns are read by the scanner 101 of the image forming apparatus (2802). The reading values of the scanner 101 are down-loaded into the density control unit (2803). The reference data for the gradation pattern is read out of the memory of the density control unit (2804), or the reference data from the image forming apparatus is down-loaded in the same manner as in the case of the reading values (2805). The computer 302 calculates the conversion table based on the above reference data (2806). The conversion table calculated by the computer 302 is up-loaded into the image forming apparatus 201 (2807). In the image forming apparatus, a test image read by the scanner 101 or an image based on image data which has been up-loaded from the computer 302 into the image forming apparatus is output using the conversion table (2808). The density of the output image is measured by the density measuring unit (2809). The above steps 2806–2809 are repeated until a proper image is formed using the conversion table based on the proper reference data (2810). The reference data which has been completely corrected is up-loaded into the image forming apparatus (2812).

In a case where the image density control unit is used as described above, the process can be accurately performed in a high speed, in comparison with a case where the reference data and the conversion table are corrected in the image forming apparatus. This advantage is based on the difference between the CPUs of the image forming apparatus and the image density control unit. To reduce the production cost of the image forming apparatus and to miniaturize the image forming apparatus, the width of the data bus for the CPU of the image forming apparatus is relatively small (e.g., a bus having 16 bits). On the other hand, the above restrictions are not placed on the CPU of the image density control unit. For example, the width of the bus for the CPU of the image density control unit may be 32 bits or 64 bits. In addition, the CPU may have reduced instruction sets (the RISC-type CPU) and can perform a super-pipeline process and a super-scalar process. Thus, the CPU of the image density control unit can perform operations at higher operations than the CPU of the image forming apparatus.

The present invention is not limited to the aforementioned embodiments, and other variations and modifications may be made without departing from the scope of the claimed invention.

What is claimed is:

1. An image forming apparatus comprising:

image output means for forming an image on a recording medium based on output image signals;

storage means for storing target data for reading values obtained by optically reading a gradation pattern, having a plurality of gradation levels, output by said image output means;

correction means for correcting an image signal conversion table used to convert input image signals into the output image signals to be supplied to said signal output means, based on reading values obtained by optically reading the gradation pattern output by said image output means and the target data stored in said storage means; and changing means for independently changing, based on an input from an operation panel, pieces of the target data respectively defined for three image density ranges of highlight, middle, and shadow portions.

2. The image forming apparatus as claimed in claim 1 further comprising:

instruction means for instructing said changing means to cause to change the target data.

3. An image forming apparatus comprising:

image output means for forming an image on a recording medium based on output image signals;

storage means for storing target data for reading values obtained by optically reading a gradation pattern, having a plurality of gradation levels, output by said image output means; and correction means for correcting an image signal conversion table used to convert input image signals into the output image signals to be supplied to said signal output means, based on reading values obtained by optically reading the gradation pattern output by said image output means and the target data stored in said storage means, wherein said image forming apparatus being coupled to an external unit for processing information, said image forming apparatus receiving from said external unit the target data which should be stored in said storage means, and said image forming apparatus receives pieces of target data respectively defined for three image density ranges of highlight, middle, and shadow portions.

* * * * *